(12) United States Patent  
Moore et al.

(10) Patent No.: US 12,375,435 B2  
(45) Date of Patent: Jul. 29, 2025

(54) SYSTEMS AND METHODS FOR INCORPORATING DYNAMIC REACTIONS INTO E-MAIL COMMUNICATIONS

(71) Applicant: Baydin, Inc., Santa Clara, CA (US)

(72) Inventors: Alexander W. Moore, Santa Clara, CA (US); Mai-Chi T. Iseri, Santa Clara, CA (US); Jeffrey P. Nulty, Santa Clara, CA (US)

(73) Assignee: Baydin, Inc., Mountain View, CA (US)

( * ) Notice: Subject to any disclaimer, the term of this patent is extended or adjusted under 35 U.S.C. 154(b) by 0 days.

(21) Appl. No.: 17/902,331

(22) Filed: Sep. 2, 2022

(65) Prior Publication Data

US 2024/0080289 A1 Mar. 7, 2024

(51) Int. Cl.
| | |
|---|---|
| *G06F 15/16* | (2006.01) |
| *H04L 51/10* | (2022.01) |
| *H04L 51/216* | (2022.01) |
| *H04L 51/42* | (2022.01) |

(52) U.S. Cl.
CPC ............ *H04L 51/10* (2013.01); *H04L 51/216* (2022.05); *H04L 51/42* (2022.05)

(58) Field of Classification Search
CPC ........ H04L 51/10; H04L 51/42; H04L 51/216
USPC ....................................................... 709/206
See application file for complete search history.

(56) References Cited

U.S. PATENT DOCUMENTS

| | | | |
|---|---|---|---|
| 7,788,248 B2 | 8/2010 | Forstall et al. | |
| 8,830,182 B1 | 9/2014 | Alakuijala | |
| 8,918,339 B2 * | 12/2014 | Rubinstein | G06Q 40/00 |
| | | | 715/977 |
| 9,264,391 B2 | 2/2016 | Castera et al. | |
| 9,628,296 B2 * | 4/2017 | Libin | G06Q 10/107 |
| 9,716,680 B2 * | 7/2017 | Taler | G06F 3/0488 |
| 9,973,456 B2 * | 5/2018 | Perigault | G06T 15/02 |
| 10,120,859 B2 | 11/2018 | Parikh et al. | |
| 10,305,838 B2 * | 5/2019 | Martinazzi | G06F 3/04817 |
| 10,445,425 B2 * | 10/2019 | Jon | G06F 40/274 |
| 10,482,163 B2 * | 11/2019 | Hullette | G06Q 50/01 |
| 10,715,473 B2 * | 7/2020 | Duale | H04L 51/226 |
| 10,749,818 B1 * | 8/2020 | Bikumala | G06F 40/20 |
| 10,904,180 B2 * | 1/2021 | DeLuca | G06Q 10/103 |
| 11,209,964 B1 * | 12/2021 | Fong | G06F 3/04817 |

(Continued)

FOREIGN PATENT DOCUMENTS

WO WO-2016/191396 A1 12/2016

*Primary Examiner* — Alicia Baturay  
(74) *Attorney, Agent, or Firm* — Foley & Lardner LLP

(57) ABSTRACT

Systems and methods for incorporating reactions in electronic messages. A computer system can receive, from a computing device, a first request for one or more images responsive to the computing device accessing an electronic message, generate the one or more images using information indicative of reactions recorded in association with the email message, and send the one or more images to the computing device for display in the email message. The computer system can receive, from the computing device, a second request for recording a first reaction to the email message responsive to the computing device interacting with a first interactive element rendered in the email message, update the information indicative of the reactions recorded in association with the email message to account for the first reaction, and send a first page confirming the recording to the computing device for display.

25 Claims, 15 Drawing Sheets

(56) References Cited

U.S. PATENT DOCUMENTS

| | | | |
|---|---|---|---|
| 11,360,637 B1* | 6/2022 | Martinazzi | H04L 51/42 |
| 11,531,406 B2* | 12/2022 | Bayer | G06F 3/04886 |
| 11,570,170 B2* | 1/2023 | Christian | H04L 12/1877 |
| 11,593,548 B2* | 2/2023 | Bayer | G06F 40/274 |
| 11,743,321 B2* | 8/2023 | Cundall | H04L 12/1822 709/230 |
| 2008/0167962 A1* | 7/2008 | Lawe | G06Q 30/0239 705/14.27 |
| 2010/0123724 A1* | 5/2010 | Moore | G06F 3/0219 345/173 |
| 2011/0301966 A1 | 12/2011 | Kartoun et al. | |
| 2012/0323928 A1* | 12/2012 | Bhatia | G06F 16/24575 707/E17.058 |
| 2014/0278978 A1* | 9/2014 | O'Connor | G06Q 30/0255 705/14.53 |
| 2015/0149925 A1* | 5/2015 | Weksler | H04L 51/046 715/752 |
| 2015/0222586 A1* | 8/2015 | Ebersman | G06F 40/274 715/752 |
| 2016/0179967 A1* | 6/2016 | Sa | G06F 16/3346 707/730 |
| 2016/0344667 A1* | 11/2016 | Lane | H04L 51/10 |
| 2016/0359771 A1* | 12/2016 | Sridhar | H04L 51/02 |
| 2017/0083174 A1* | 3/2017 | Tobens, III | G06F 3/0485 |
| 2017/0131870 A1* | 5/2017 | Harper | H04M 1/72436 |
| 2017/0147185 A1* | 5/2017 | Milvaney | G06F 3/04842 |
| 2017/0171267 A1* | 6/2017 | Cornell | G06Q 10/10 |
| 2017/0180276 A1* | 6/2017 | Gershony | H04L 51/222 |
| 2017/0185581 A1* | 6/2017 | Bojja | G06V 30/19173 |
| 2017/0257329 A1 | 9/2017 | Tetreault et al. | |
| 2017/0286366 A1* | 10/2017 | Chang | G06F 40/103 |
| 2017/0308290 A1* | 10/2017 | Patel | G06F 3/04817 |
| 2017/0322923 A1 | 11/2017 | Dixon et al. | |
| 2017/0336926 A1* | 11/2017 | Chaudhri | G06F 3/0412 |
| 2017/0359701 A1* | 12/2017 | Sarma | H04L 51/10 |
| 2018/0083898 A1* | 3/2018 | Pham | H04L 51/046 |
| 2018/0083901 A1* | 3/2018 | McGregor, Jr. | H04L 51/02 |
| 2018/0136794 A1* | 5/2018 | Cassidy | G06F 3/0488 |
| 2018/0173692 A1* | 6/2018 | Greenberg | G06F 3/04886 |
| 2018/0255009 A1* | 9/2018 | Chen | G06Q 50/01 |
| 2018/0356957 A1* | 12/2018 | Desjardins | G06F 40/274 |
| 2019/0066159 A1* | 2/2019 | Caudillo | B60R 16/0234 |
| 2019/0087086 A1* | 3/2019 | Kandur Raja | G06N 5/02 |
| 2019/0258382 A1* | 8/2019 | Clediere | G06F 3/04817 |

\* cited by examiner

SYSTEMS AND METHODS FOR INCORPORATING DYNAMIC REACTIONS INTO E-MAIL COMMUNICATIONS

BACKGROUND

Email messages are typically static. In other words, the content of an email message cannot be modified once the email message is sent. One reason that the content of email messages does not change once the messages are sent is that email messages are exchanged across different email platforms that are owned and/or controlled by different entities. For instance, the email account of a sender of an email message can be associated with a first email provider while the email account(s) of the recipient(s) of the email message can be associated with one or more second email providers. Other types of electronic messages, such as short message service (SMS) messages, are also static in nature and cannot be modified once sent.

SUMMARY

The systems and methods described herein improve upon conventional electronic messaging systems (e.g., email systems) by incorporating dynamic reactions in electronic messages and monitoring and recording the reactions of recipients of the electronic messages over time. According to embodiments described herein, a computer system can provide software instructions for embedding in a composed email message or other electronic message to incorporate interactive content in the electronic message, report user interactions with the interactive content, and display dynamic content in the electronic message indicative of reactions reported in relation with the electronic message. The incorporated interactive content allows recipients of the electronic message to react to content of the message. The computer system can record the reactions and reflect the recorded reactions in the electronic message when the message is refreshed by the recipient or accessed by another recipient. The interactive content can include one or more interactive elements, such as a link, an image map overlaid over one or more images depicting one or more reactions and/or one or more interactive images depicting the one or more reactions, e.g., emoji reactions.

The link when actuated can cause display of a window or page including a plurality of interactive content items (e.g., interactive images or graphical elements) representing a plurality of reactions, e.g., emoji reactions. The recipient of the email or electronic message can interact with, e.g., by clicking or tapping, one of the interactive content items in the window or page to record a specific reaction depicted by the content item. Upon the message recipient interacting with the interactive image in the window or page, a remote computer system (e.g., including one or more servers) can record the recipient's reaction. When the recipient refreshes the electronic message or another recipient accesses the same message, an updated version of the message indicating the recorded reaction can be displayed.

In some implementations, the electronic message can include a plurality of interactive images, each of which can depict a corresponding reaction (e.g., a corresponding emoji reaction) and can be associated with a corresponding link (e.g., a uniform resource locator (URL)). When the recipient of the electronic message interacts with an interactive image of the plurality of interactive images, a request to record the corresponding reaction can be sent from the recipient's computing device to the computer system using the corresponding link. The corresponding link can be viewed as a request to record the corresponding reaction that is sent to the computer system upon the recipient interacting with the interactive image. The corresponding link can include an identifier of the corresponding reaction or of the interactive image. Upon receiving the request, the computer system can record the recipient's reaction. The remote server can provide updated versions of the interactive images or an updated version of a graphical element to be displayed in the electronic message (e.g., when the message is refreshed or re-accessed by the recipient or accessed by another recipient). The updated versions of the interactive images or the updated version of a graphical element can depict the reactions recorded in association with the electronic message.

The image map can include one or more interactive areas each of which overlapping with, or overlaid over, a corresponding graphical element of the image. The recipient can select a reaction via the image map and the computing device of the recipient can report the selected reaction to the computer system for recording. In some other implementations, the interactive content can include a link of a page through which the recipient can select a reaction among one or more reactions. The page can be displayed in pop up window responsive to activating the link in the email message. The image can include one or more interactive content items depicting the one or more dynamic reactions.

At least one aspect of the present disclosure relates to a computer system including one or more processors and at least one memory that stores computer-executable instructions. The computer-executable instructions, when executed by the one or more processors, can cause the one or more processors to receive, from a computing device, a first request for one or more images responsive to the computing device accessing an email message, generate, responsive to the first request, the one or more images using information indicative of reactions recorded in association with the email message, and send the one or more images to the computing device for display in the email message. The one or more images when displayed in the email message depict one or more first graphical elements representing one or more reactions to the email message. The one or more processors can receive, from the computing device, a second request for recording a first reaction to the email message responsive to the computing device interacting with a first interactive element rendered in the email message. The second request can be a request for a first page and can include an indicator of the first reaction. The one or more processors can update, responsive to the second request, the information indicative of the reactions recorded in association with the email message to account for the first reaction. The one or more processors can send the first page to the computing device for display. The first page can confirm the recording of the first reaction to the email message.

In some implementations, the first interactive element includes an image map overlaid over the one or more images when displayed within the email message. The indicator of the first reaction can include an identifier of the image map and an identifier of a first interactive area, of a plurality of interactive areas of the image map, with which the computing device interacted. Each graphical element of the one or more first graphical elements can represent a corresponding reaction and can be associated with a corresponding interactive area of the plurality of interactive areas of the image map. The one or more processors can identify the first reaction using the identifier of the image map and the identifier of the first interactive area of the image map.

In some implementations, the second request can include at least one of a uniform resource locator (URL) including the indicator of the first reaction, or a session cookie of the computing device. In some implementations, the one or more image can include one or more interactive images. Each interactive image can depict a corresponding graphical element of the one or more first graphical elements and can represent a corresponding reaction of the one or more reactions. The first interactive element can include a first interactive image of the one or more interactive images. Each interactive image can be associated with a respective link including an identifier of the interactive image. The one or more processors can receive, from the computing device, a first link associated with the first interactive image upon the computing device interacting with the first image. The first link can represent the second request and can include an identifier of the first image. The one or more processors can identify the first reaction based on the identifier of the first image.

In some implementations, the first interactive element includes a link indicative of a second page including a plurality of interactive content items representing a plurality of reactions. In receiving the second request for recording the first reaction, the one or more processors can receive, from the computing device, a third request for the second page responsive to the computing device interacting with the link rendered in the email message. The one or more processors can provide, responsive to the third request, the second page to the computing device for display. The one or more processors can receive, from the computing device, the second request for recording the first reaction to the email message responsive to the computing device interacting with an interactive content item of the plurality interactive content items in the second page.

In some implementations, the one or more images when displayed in the email message can further depict a second graphical element indicative of a second page including one or more interactive content items representing one or more additional reactions. In receiving the second request for recording the first reaction, the one or more processors can receive, from the computing device, a third request for the second page responsive to the computing device interacting with the first interactive element rendered in the email message, provide, responsive to the third request, the second page to the computing device for display, and receive, from the computing device, the second request for recording the first reaction to the email message responsive to the computing device interacting with an interactive content item of the one or more interactive content items in the second page. The first interactive element can include an interactive area of an image map overlaid over the one or more images such that the interactive area overlaps the second graphical element or an interactive image displayed in the email message and depicting the second graphical element.

In some implementations, the one or more processors can further receive a third request for the one or more second images from a second computing device responsive to the second computing device accessing the email message. The one or more processors can generate the one or more second images using the updated information indicative of the reactions recorded in association with the email message. The one or more processors can send the one or more second images to the second computing device for display in the email message accessed by the second computing device. In some implementations, the one or more processors can receive a third request for the one or more images from the computing device responsive to the computing device refreshing the email message. The one or more processors can generate the one or more second images using the updated information indicative of the reactions recorded in association with the email message, and send the one or more second images to the computing device for display in the refreshed email message. In some implementations, the one or more first graphical elements depicted by the one or more images represent one or more reactions recorded in association with the email message.

At least one other aspect of the present disclosure is generally directed to a method for incorporating reactions in email messages. The method can include a computer system receiving, from a computing device, a first request for one or more images responsive to the computing device accessing an email message, generating, responsive to the first request, the one or more images using information indicative of reactions recorded in association with the email message, and sending the one or more images to the computing device for display in the email message. The one or more images when displayed in the email message can depict one or more first graphical elements representing one or more reactions to the email message. The method can include the computer system receiving, from the computing device, a second request for recording a first reaction to the email message responsive to the computing device interacting with a first interactive element rendered in the email message. The second request can be a request for a second page and can include an indicator of the first reaction. The method can include the computer system updating, responsive to the second request, the information indicative of the reactions recorded in association with the email message to account for the first reaction. The method can include the computer system sending the first page to the computing device for display. The first page can confirm the recording of the first reaction to the email message.

In some implementations, the first interactive element includes an image map overlaid over the one or more images when displayed within the email message. The indicator of the first reaction can include an identifier of the image map and an identifier of a first interactive area, of a plurality of interactive areas of the image map, with which the computing device interacted. Each graphical element of the one or more first graphical elements can represent a corresponding reaction and can be associated with a corresponding interactive area of the plurality of interactive areas of the image map. The method can further include the computer system identifying the first reaction using the identifier of the image map and the identifier of the first interactive area of the image map.

In some implementations, the second request can include at least one of a uniform resource locator (URL) including the indicator of the first reaction or a session cookie of the computing device. In some implementations, the one or more images include one or more interactive images. Each interactive image can depict a corresponding graphical element of the one or more first graphical elements and can represent a corresponding reaction of the one or more reactions. The first interactive element can include a first interactive image of the one or more interactive images. Each interactive image can be associated with a respective link including an identifier of the interactive image. The method can include the computer system receiving a first link associated with the first interactive image upon the computing device interacting with the first interactive image. The first link can represent the second request and can include an identifier of the first interactive image. The method can include the computer system identifying the first reaction based on the identifier of the first interactive image.

In some implementations, the first interactive element includes a link indicative of a second page including a plurality of interactive content items representing a plurality of reactions. Receiving the second request for recording the first reaction can include the computer system receiving, from the computing device, a third request for the second page responsive to the computing device interacting with the link rendered in the email message, providing, responsive to the third request, the second page to the computing device for display, and receiving, from the computing device, the second request for recording the first reaction to the email message responsive to the computing device interacting with an interactive content item of the plurality interactive content items in the second page.

In some implementations, the one or more images when displayed in the email message further depict a second graphic element indicative of a second page including one or more interactive content items representing one or more additional reactions. Receiving the second request for recording the first reaction can include the computer system receiving, from the computing device, a third request for the second page responsive to the computing device interacting with the first interactive element rendered in the email message, providing, responsive to the third request, the second page to the computing device for display, and receiving, from the computing device, the second request for recording the first reaction to the email message responsive to the computing device interacting with an interactive content item of the one or more interactive content items in the second page. The first interactive element can include an interactive area of an image map overlaid over the one or more images such that the interactive area overlaps the second graphical element, or an interactive image displayed in the email message and depicting the second graphical element. In some implementations, the method can further include the computer system receiving a third request for one or more images from a second computing device responsive to the second computing device accessing the email message, and generating the one or more second images using the updated information indicative of the reactions recorded in association with the email message. The method can include the computer system sending the one or more second images to the second computing device for display in the email message.

In some implementations, the method can further include the computer system receiving a third request for one or more second images from the computing device responsive to the computing device refreshing the email message, and generating the one or more second images using the updated information indicative of the reactions recorded in association with the email message. The method can include the computer system sending the one or more second images to the computing device for display in the refreshed email message. In some implementations, the one or more first graphical elements depicted by the one or more images represent one or more reactions recorded in association with the email message.

At least one other aspect of the present disclosure is a non-transitory computer-readable medium storing computer-executable instructions. The computer-executable instructions, when executed by at least one processor, can cause the at least one processor to receive, from a computing device, a first request for one or more images responsive to the computing device accessing an email message, generate, responsive to the first request, the one or more images using information indicative of reactions recorded in association with the email message, and send the one or more images to the computing device for display in the email message. The one or more images when displayed in the email message depict one or more first graphical elements representing one or more reactions to the email message. The at least one processor can receive, from the computing device, a second request for recording a first reaction to the email message responsive to the computing device interacting with a first interactive element rendered in the email message. The one or more processors can send the first page to the computing device for display. The second request can be a request for a first page and can include an indicator of the first reaction. The at least one processor can update, responsive to the second request, the information indicative of the reactions recorded in association with the email message to account for the first reaction. The at least one processor can send the first page to the computing device for display. The first page can confirm the recording of the first reaction to the email message.

At least one aspect of the present disclosure relates to a computer system including one or more processors and at least one memory that stores computer-executable instructions. The computer-executable instructions, when executed by the one or more processors, can cause the one or more processors to receive, from a first computing device, a request to incorporate reactions in an email message, and provide, to the first computing device, software instructions for embedding within the email message. The software instructions, when executed by the second computing device accessing the email message, can cause the second computing device to (i) send, to a computer system, a first request for one or more images upon the second computing device accessing the email message, (ii) receive, responsive to the first request, the one or more images from the computer system, the one or more images generated using information indicative of reactions recorded in association with the email message, (iii) display the one or more images in the email message, and (iv) send, to the computer system, a second request for recording a first reaction to the email message upon the second computing device interacting with the first interactive element rendered in the email message. The one or more images when displayed in the email message can depict one or more first graphical elements representing one or more reactions to the email message. Displaying the one or more images in the email message can include rendering a first interactive element in the email message. The second request can be a request for a first page and including an indicator of the first reaction.

At least one other aspect of the present disclosure relates to a method comprising one or more processors receiving, from a first computing device, a request to incorporate reactions in an email message, and providing, to the first computing device, software instructions for embedding within the email message. The software instructions, when executed by the second computing device accessing the email message, can cause the second computing device to (i) send, to a computer system, a first request for one or more images upon the second computing device accessing the email message, (ii) receive, responsive to the first request, the one or more images from the computer system, the one or more images generated using information indicative of reactions recorded in association with the email message, (iii) display the one or more images in the email message, and (iv) send, to the computer system, a second request for recording a first reaction to the email message upon the second computing device interacting with the first interactive element rendered in the email message. The one or more images when displayed in the email message can depict one or more first graphical elements representing one or more reactions to the email message. Displaying the one or more images in the email message can include rendering a first interactive element in the email message. The second request can be a request for a first page and including an indicator of the first reaction.

At least one aspect of the present disclosure relates to a non-transitory computer-readable medium storing computer-executable instructions. The computer-executable instructions, when executed by one or more processors, can cause the one or more processors to receive, from a first computing device, a request to incorporate reactions in an email message, and provide, to the first computing device, software instructions for embedding within the email message. The software instructions, when executed by a second computing device accessing the email message, can cause the second computing device to (i) send, to a computer system, a first request for one or more images upon the second computing device accessing the email message, (ii) receive, responsive to the first request, the one or more images from the computer system, the one or more images generated using information indicative of reactions recorded in association with the email message, (iii) display the one or more images in the email message, and (iv) send, to the computer system, a second request for recording a first reaction to the email message upon the second computing device interacting with the first interactive element rendered in the email message. The one or more images when displayed in the email message can depict one or more first graphical elements representing one or more reactions to the email message. Displaying the one or more images in the email message can include rendering a first interactive element in the email message. The second request can be a request for a first page and including an indicator of the first reaction.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using one or more suitable apparatuses, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
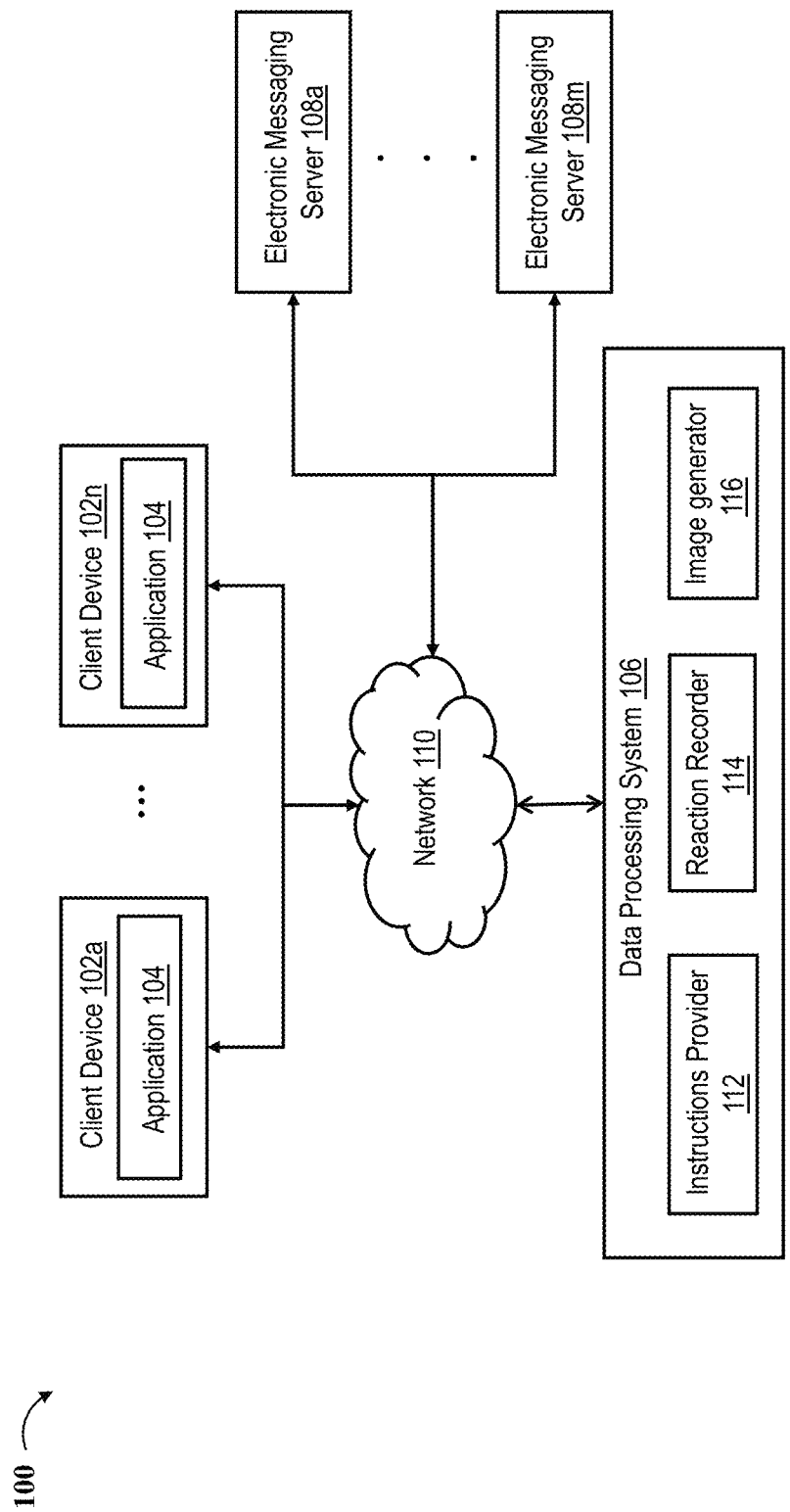
FIG. 1 illustrates a block diagram of an example computer environment for incorporating and monitoring reactions in electronic messages, in accordance with example embodiments.

Below are detailed descriptions of various concepts related to, and implementations of, techniques, approaches, methods, apparatuses, and systems for incorporating reactions, e.g., emoji reactions, in electronic messages (e.g., email messages) and monitoring reactions selected by recipients of the electronic messages. The various concepts introduced above and discussed in greater detail below may be implemented in any of numerous ways, as the described concepts are not limited to any particular manner of implementation. Examples of specific implementations and applications are provided primarily for illustrative purposes.

In social networks, some messaging applications and/or teleconferencing applications, users can express their reactions to posts or messages generated by other users. Specifically, such platforms or applications provide animated "emoji" reactions that users can select in connection with messages or posts. In response, the teleconferencing platforms, messaging applications and/or social networks record or keep track of the reactions selected by users over time, and update the posts or messages to indicate or reflect the recorded reactions. In particular, the teleconferencing platforms, messaging applications and/or social networks usually add interactive graphical elements in shared content to allow users with whom the content is shared to select from various possible reactions, and add images or visual representations in the shared content depicting recorded reactions. The images or visual representations depicting recorded reactions are updated with each new recorded reaction. The reactions as used herein can reflect the users' feelings or opinions about the shared content.

Unlike the teleconferencing platforms, messaging applications and/or social networks, some electronic messaging systems or services, such as email systems, do not include functionalities or processes for incorporating reactions in electronic messages (e.g., email messages). For instance, content of email messages is static and cannot be changed once the email messages are sent. While shared content in teleconferencing platforms, some messaging applications and/or social networks is confined to a single system or platform, email messages once sent can traverse different email platforms associated with different email providers. In other words, the email account of the sender and the email account(s) of the recipient(s) can be associated with different email providers. As such, once the sender sends an email message to the recipient, the email provider associated with the email account of the sender will have no control on the email message. This characteristic of email systems makes it technically challenging to incorporate dynamic reactions in email messages.

The systems and methods described herein solve the above described technical problem and provide various processes for incorporating reactions in electronic messages and recording reactions selected by recipients of the electronic messages. The systems and methods described herein also allow for depicting visual representations of already recorded reactions in the electronic messages. In particular, when composing an electronic message, e.g., an email message, a user can select to incorporate reactions in the electronic message. In response, a data processing system (also referred to herein as a computer system) can insert executable instructions in the electronic message, e.g., before the electronic message is sent to the intended recipient(s), to allow for recording various reactions to the electronic message from recipients of the electronic message. When a recipient opens or accesses the electronic message, the computing device of the recipient can execute the instructions in the electronic message. When executed, the instructions can cause the computing device of the recipient to request and display one or more interactive visual representations of possible reactions. The computing device of the recipient can also display an indication of reactions already recorded in relation with the electronic message. The already recorded reactions can include reactions previously selected or made by other recipients of the electronic message.

The current recipient can select, or interact with, one of the interactive visual representations. In response, the computing device of the recipient can transmit an indication of the interaction to the data processing system, which in turn can record the reaction selected by the recipient. The data processing system can update data indicative of already recorded reactions based on the received indication. Upon the recipient refreshing the accessed electronic message or upon another recipient accessing the electronic message, the data processing system can generate and send a visual representation of the recorded reactions, based on the updated data, for display to the recipient or to the other recipient, e.g., within the electronic message. Accordingly, recipients of the electronic message can be presented with a visual representation of the up-to-date recorded reactions each time a recipient accesses an instance of the electronic message or refreshes an accessed instance of the electronic message.

The systems and methods described herein can incorporate reactions in electronic messages according to various embodiments. According to an example embodiment, the executable instructions can cause the computing device of the recipient to request one or more images from the data processing system responsive to opening or accessing an instance of the electronic message. In response, the data processing system can send the one or more images to the computing device of the recipient for display within the accessed instance of the electronic message. The one or more images can include visual representations of various possible reactions. The data processing system can also provide instructions for an image map to the computing device of the recipient. The computing device of the recipient can overlay the image map over the one or more images displayed within the instance of the email message to allow the recipient to select a reaction among the various possible reactions depicted in the one or more images.

According to another embodiment, the executable instructions can cause the computing device of the recipient to request a plurality of images or graphical representations from the data processing system responsive to opening or accessing an instance of the electronic message. In response, the data processing system can send the plurality of images or graphical representations to the computing device of the recipient for display within the accessed instance of the electronic message. Each of the images or graphical representations can depict a corresponding reaction of a plurality of possible reactions, and can be associated with a corresponding link (e.g., hyperlink or URL). The corresponding link can be viewed as, or can include information or parameters of, a request to record the corresponding reaction. The data processing system can also provide instructions for an image map to the computing device of the recipient. Upon the recipient interacting with an image of the plurality of images displayed within the electronic message, the computing device of the recipient can send a request, using the corresponding link, to a remote server to record the corresponding reaction. The remote server can update data indicative of recorded reactions associated with electronic message. The remote server may provide updated versions of the plurality images or graphical representations in new instances of the electronic message (e.g., instances requested upon the recipient refreshing the electronic message or upon other recipients requesting access to the electronic message) to reflect the updated recorded reactions.

According to another example embodiment, the executable instructions embedded in the electronic message can cause the computing device of the recipient, upon accessing an instance of the electronic message, to display a hyperlink of a page within the accessed instance of the electronic message. The page can include interactive visual representations of the various possible reactions. The page may also include indications of already recorded reactions in relation to the electronic message. Upon the recipient activating the hyperlink, the computing device can request and display the page. The recipient can interact with any of the interactive visual representations, and in response the computing device of the recipient can send an indication of the reaction made or selected by the recipient to the data processing system. Upon receiving the indication, the data processing system can update data indicative of recorded reactions in relation to the electronic message. The updated data can be reflected in the page pointed to by the hyperlink, e.g., upon refreshing the page. In other words, when accessed again by the same recipient or another recipient, the page can depict updated indications of the already recorded reactions in relation to the electronic message.

The systems and methods described herein provide an improvement over conventional electronic systems, e.g., email systems, by providing interactive items indicative of various possible reactions for display with electronic messages, upon accessing the electronic messages. The interactive items allow recipients to express their reactions to received electronic messages, such as email messages. Reactions made by different recipients can be recorded and up-to-date indications of the recorded reactions can be displayed within or with new instances (e.g., based on new access or refresh requests) of the electronic messages. Accordingly, the embodiments described herein make the content of electronic messages, e.g., email messages, dynamic and more interactive.

Referring now to FIG. 1, illustrated is a block diagram of an example computer environment 100 for incorporating dynamic reactions in electronic messages, in accordance with one or more implementations. The computer environment 100 can include a plurality of client devices 102a-102n referred to hereinafter, either individually or collectively, as client device(s) 102. The client devices 102 can include computing devices such as a desktop, a laptop, a tablet device or a smart phone, among others. Each of the client devices 102 can include, or can have access to, an application 104 for accessing user electronic accounts. The application 104 can include an email application, such as the OUTLOOK application, the GMAIL application or the YAHOO MAIL application, among other email applications. In some implementations, the application 104 can include a web browser. For instance, the client devices 102 can access an email service using a web browser. The application 104 can include an SMS application or an application for accessing other types of electronic messages.

Each client device 102 can include a local machine, computer, laptop, desktop, smart phone, tablet, personal digital assistant, set-top box for a television set, a smart television, or server device configured to communicate with other devices via the network 110. The client device 102 can include a processor and a memory. The memory may store machine instructions that, when executed by the processor, cause the processor to perform one or more of the operations described herein, such as operations associated with the application 104. The memory may also store data to effect presentation of one or more resources, content items, etc., on the computing device. The processor may include a microprocessor, an ASIC, an FPGA, a GPU, or combinations thereof. The memory may include, but is not limited to, electronic, optical, magnetic, or any other storage or transmission device capable of providing processor with program instructions. The memory may include a floppy disk, CD-ROM, DVD, magnetic disk, memory chip, ROM, RAM, EEPROM, EPROM, flash memory, optical media, or any other suitable memory from which processor can read instructions. The processor may execute computer-executable instructions to carry out the operations described herein. The instructions may include code from any suitable computer programming language such as, but not limited to, ActionScript®, C, C++, C#, HTML, Java®, JavaScript®, Perl®, Python®, Visual Basic®, and XML.

The computer environment 100 can include a data processing system 106 (also referred to herein as computer system 106) and a plurality of electronic messaging servers 108a-108m referred to hereinafter, either individually or collectively, as electronic messaging server(s) 108. The electronic messaging servers 108 can include, for example, email servers that provide email services to users and host their email accounts. The client devices 102, the data processing system 106 and the electronic messaging servers 108 can be communicatively coupled through a communication network 110. The data processing system 106 can communicate via the network 110, for instance with at least one client device 102. The network 110 may be any form of computer network that can relay information between the client devices 102, the data processing system 106, the electronic messaging servers 108, and one or more content sources, such as web servers, amongst others. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive and/or transmit data within the network 110. The network 110 may further include any number of hardwired and/or wireless connections. Any or all of the computing devices described herein (e.g., the data processing system 106, the client devices 102, the computer system 900, etc.) may communicate wirelessly (e.g., via WiFi, cellular, radio, etc.) with a transceiver that is hardwired (e.g., via a fiber optic cable, a CAT5 cable, etc.) to other computing devices in the network 110. Any or all of the computing devices described herein (e.g., the data processing system 106, the computer system 900, etc.) may also communicate wirelessly with the computing devices of the network 110 via a proxy device (e.g., a router, network switch, or gateway).

The data processing system 106 can include one or more computing devices, such as computer servers, configured to implement and execute functionalities and/or processes of the data processing system 106. The data processing system 106 can include at least one processor and a memory (e.g., a processing circuit). The memory can store computer-executable instructions that, when executed by the processor, cause the processor to perform one or more of the operations described herein. The processor may include a microprocessor, an application-specific integrated circuit (ASIC), a field-programmable gate array (FPGA), a graphics processing unit (GPU), or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 106 can include one or more computing devices or servers that can perform various functions as described herein. The data processing system 106 can include any or all of the components and perform any or all of the functions of the computer system 800 described herein in conjunction with FIG. 8.

The data processing system 106 can include various functional components. For instance, the data processing system 106 can include an instructions provider 112, a reaction recorder 114 and an image generator 116. Each of these functional components can be implemented as software modules, hardware components, firmware components or a combination thereof. For instance, each of the functional components 112, 114 and 116 can be implemented as software instructions that are executable by one or more processors to perform the corresponding functions or processes. In some implementations, one or more functional components (e.g., any combination of the functional components 112, 114 and 116) of the data processing system 106 can be implemented by one or more email servers 108.

The instructions provider 112 can be configured to provide executable instructions to client devices 102 for embedding within electronic messages. The executable instructions when executed by client devices 102 accessing or drafting an electronic message can cause one or more interactive elements or data items, e.g., a link or one or more interactive images, to be incorporated in the electronic message. The one or more interactive elements and/or the instructions embedded in the electronic message allow recipients of the electronic message to electronically express their reactions to the electronic message and to report the expressed reactions to the data processing system 106 or the reaction recorder 114. The reaction recorder 114 can be configured to receive indications of reactions made or selected by recipients of the electronic message and maintain a record and/or keep track of already registered (or selected) reactions in relation with the electronic message. The image generator 116 can generate and/or provide images for display within or with the electronic message. The images provided by the image generator 116 can include images indicative of possible reactions (e.g., reaction bars or separate images depicting separate reactions) and/or images depicting statistics or information of already recorded reactions. The functions and/or processes performed by each of the functional processes 112, 114 and 116 and/or the data processing system 106 are discussed in further detail below in relation with FIGS. 2-8.

Figure 2:
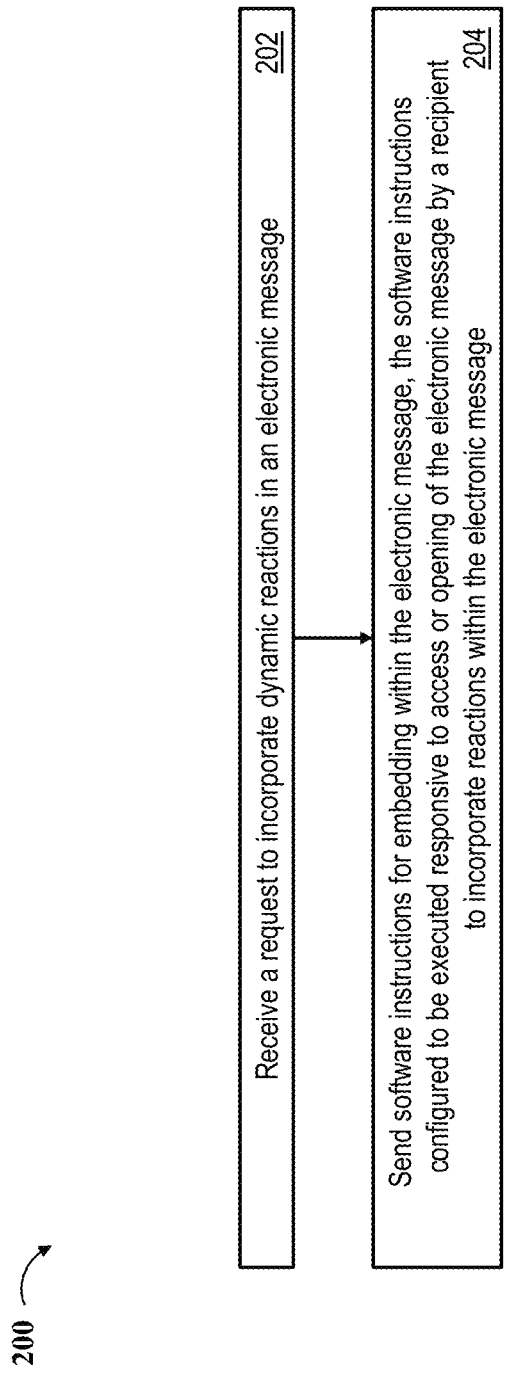
FIG. 2 depicts a flowchart illustrating a method of incorporating reactions into electronic messages, according to example embodiments.

Referring now to FIG. 2, a flowchart illustrating a method 200 of incorporating dynamic reactions into electronic messages is shown, according to example embodiments. In brief overview, the method 200 can include the data processing system 106 receiving a request from a client device 102 to incorporate reactions or visual representations thereof in an electronic message (STEP 202), and the data processing system 106 sending software instructions to the computing device 102 for embedding within the electronic message (STEP 204). The electronic message can include an email message, e.g., drafted by the c computing device 102 and/or sent to one or more recipients. The software instructions, when executed by a second computing device accessing the electronic message, can cause the second computing device to (i) send, to the computer system 106, a first request for one or more images upon the second computing device accessing the electronic message, (ii) receive, responsive to the first request, the one or more images from the computer system 106, (iii) display the one or more images in the electronic message, and (iv) send, to the computer system 106, a second request for recording a first reaction to the electronic message upon the second computing device interacting with an interactive element rendered in the email message. The one or more images can be generated using information indicative of reactions recorded in association with the electronic message. The one or more images when displayed in the electronic message can depict one or more first graphical elements representing one or more reactions to the electronic message. Displaying the one or more images in the electronic message can include rendering the first interactive element in the email message. The second request can be a request for a first page and including an indicator of the first reaction.

The method 200 can include the data processing system (or computer system) 106 receiving a request from a client device 102 to incorporate reactions in an electronic message, e.g., an email message drafted, sent or accessed by the computing device 102 (STEP 202). For instance, when a user is composing an email message, the user can select to incorporate reactions into the email message. In response, the corresponding computing device 102 can send a request to the data processing system 106 to incorporate reactions in the electronic message. The data processing system 106 or the instructions provider 112 can send software instructions to the client device 102 for embedding within the electronic message. In some implementations, the data processing system 106 or the instructions provider 112 can provide the software instructions to an electronic messaging server 108, such as an email server associated with an email system hosting the email account of the user (e.g., sender of the email message). When the sender sends the email message, the email server can embed the software instructions into the email message, e.g., prior to forwarding the email message to email accounts of intended recipients.

Figure 3A:
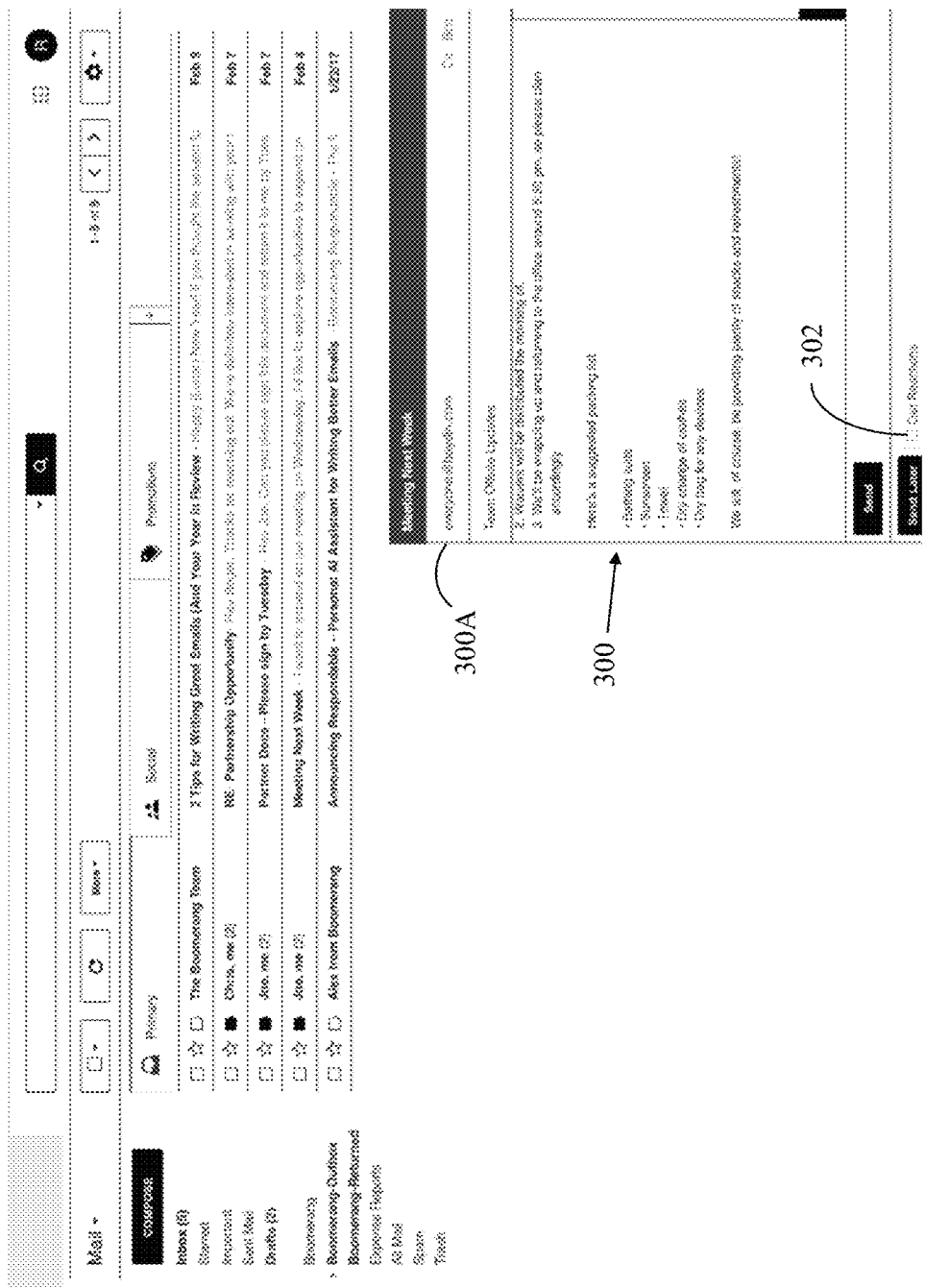
FIGS. 3A and 3B show screenshots of two instances of a window for composing an email message, according to example embodiments.
Figure 3B:
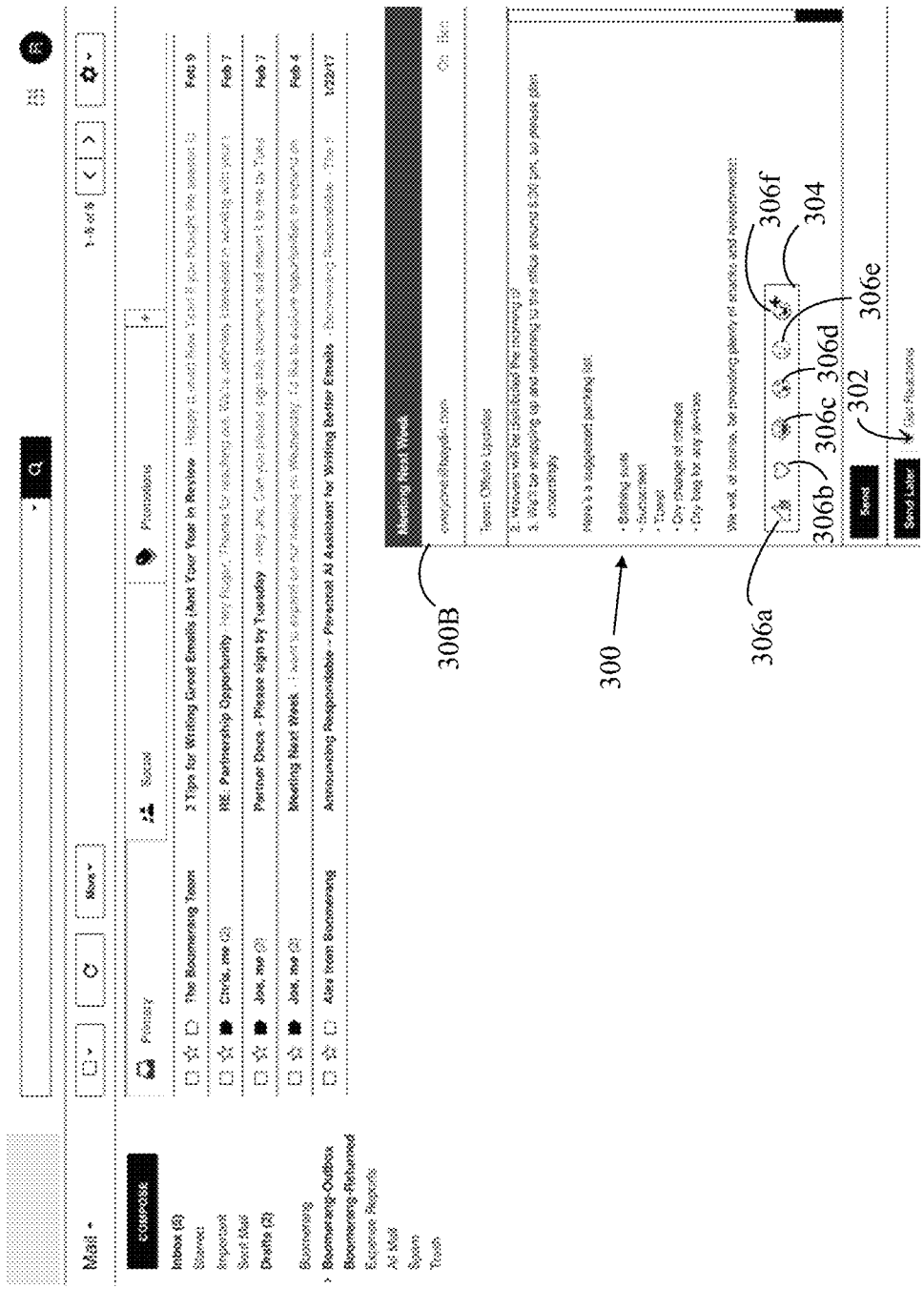

Referring now to FIGS. 3A and 3B, screenshots of two instances 300A and 300B of a window 300 for composing an email message are shown, according to example embodiments. The application 104 (e.g., email application or a browser) can display the window 300 on a display device associated with a client device of a user (e.g., a sender) responsive to the user initiating composing of an email message. The window 300 can include a selectable icon 302 to enable or disable reactions within the email message being composed. In the instance 300A of the window 300 the icon 302 is not selected yet. In the instance 300B, the icon 302 is selected. Responsive to selecting the icon 302 by the sender, the client device 102 of the sender can send a request to the data processing system 106. The request can be indicative of the user selection to incorporate reactions into the email message being composed.

The method 200 can include the data processing system 106 or the instructions provider 112 sending software instructions for embedding within the electronic message (STEP 204). The data processing system 106 or the instructions provider 112 can respond to the received request by sending the software instructions to the client device 102 of the sender for embedding in the electronic message. The client device 102 of the sender can embed the received software instructions into the electronic message. The software instructions when embedded in the electronic message (e.g., email message) are not to be rendered by the client device 102 in the window 300 or as part of the content of the email message. Instead, the embedded executable software are for execution by client devices 102 accessing the email message.

In some implementations, the client device 102 of the sender can execute at least part of the software instructions embedded into the electronic message being composed. For instance, upon embedding the software instructions within the electronic message, the client device 102 of the sender can send a request to the data processing system 106 for one or more images depicting various reactions to the electronic message. As depicted in FIG. 3B, the client device 102 of the sender can display a received image 304 within the email message being composed. For example, the client device 102 of the sender can display the received image 304 at the end (or at the bottom) of the email message being composed.

The image 304 can depict a reaction bar including a plurality of (or one or more) graphical elements, such as graphical elements 306a-f. The graphical elements can include one or more graphical elements, such as graphical elements 306a-e, indicative of various possible reactions.

The image 304 can include a graphical element, e.g., graphical element 306f, to indicate that additional graphical elements representing other reactions (other than those depicted in the image 304) can be accessed. Displaying the image 304 (or the reaction bar) to the sender in the email message (or electronic message) being composed provides a visual picture to the sender of how the email message will look like when sent and opened by intended recipients. The image 304 displayed in the email message being composed also provides the sender a visual indicator that the request to incorporate reactions into the email message was successfully handled.

In some implementations, the request to incorporate reactions in the electronic can be a request for a plurality of images. Each image can depict a separate reaction (e.g., emoji reaction). Each image can be associated with a corresponding hyperlink (e.g., URL). The software instructions may cause display of the plurality of images to the sender within the electronic message to indicate successful incorporation of the reactions into the electronic message. In some other implementations, the request for reactions can be a request for a hyperlink to be displayed within the electronic message. The hyperlink can be a link of a web page (e.g., to be displayed in a pop-up window when the hyperlink is activated) that includes a plurality of interactive images or graphical representations, each of which representing a separate reaction (e.g., emoji reaction). The executable instructions may cause display of the hyperlink to the sender within the electronic message to indicate successful incorporation of the reactions into the electronic message.

The sender can send the electronic message (e.g., email message) to intended recipients and the software instructions embedded in the electronic message can be configured to be executed by computing devices accessing the electronic message. For instance, the software instructions embedded in the electronic message can be configured to be executed each time a recipient of the intended recipients opens, accesses or refreshes the received electronic message. Responsive to the recipient opening the electronic message, the corresponding client device 102 can immediately execute the software instructions embedded within the electronic message. When executed, the instructions can cause the client device 102 of the recipient to (i) send, to the computer system 106, a first request for one or more images upon the client device 102 of the recipient accessing the electronic message, (ii) receive, responsive to the first request, the one or more images from the computer system 106, (iii) display the one or more images in the electronic message, and (iv) send, to the computer system 106, a second request for recording a first reaction to the electronic message upon the second computing device interacting with a first interactive element rendered in the email message.

The client device 102 of the recipient can send the first request to the data processing system 106. The first request can be a request for one or more images for display within the accessed electronic message. For instance, the software instructions can include a first uniform resource locator (URL) of a server of the data processing system 106 that is used to request the image(s) from the server. The requested image(s) can be generated by the data processing system 106 using information indicative of reactions recorded (so far) in association with the electronic message. For instance, the data processing system 106 can check whether any reactions were already recorded, e.g., by one or more other recipients, in association of the electronic message. If one or more reactions were previously recorded, the data processing system 106 can generate the one or more images to depict graphical elements representing the previously recorded reaction(s). If no reactions were previously recorded, the data processing system 106 can generate the one or more images to depict graphical elements representing default or randomly selected reaction(s).

Upon receiving the image(s), the executable instructions can cause the client device 102 of the recipient to display the received image(s) within the electronic message accessed (or displayed) by the client device 102 of the recipient. Similar to the image 304, the image(s) displayed within the electronic message accessed by the client device 102 of the recipient can include one or more graphical elements representing or indicative of one or more possible reactions (e.g., emoji reactions). For instance, the graphical elements can include graphical symbols, animated stickers, digital sub-images, icons or a combination thereof among others. Each graphical element can be indicative of a corresponding emotional response, idea or opinion that a user (e.g., the recipient) may express in relation with the received electronic message. The displayed image(s) can depict reactions previously recorded (e.g., by one or more other recipients) in association with the electronic message. If no reactions were recorded yet in association with the electronic message, the image(s) can depict one or more default or randomly selected reactions. The displayed image(s) can be interactive or non-interactive. For instance, one or more non-interactive images depicting reactions previously recorded in association with the electronic message can be displayed in the electronic message with a hyperlink that is used to record additional reactions. The received image(s) can include one or more images depicting graphical elements representing one or more reactions and an image map overlaid over the one or more images when displayed in the electronic message. The received image(s) can include multiple images corresponding to separate reactions that re displayed in the electronic message, such that each image is associated with a corresponding hyperlink.

In some implementations, the software instructions embedded within the electronic message can include (or can request and receive from the data processing system 106) a software code (e.g., an HTML code) that defines an image map. The software code, when executed by the client device 102 of the recipient, can cause the image map to be overlaid over the image(s) displayed within the electronic message accessed by the client device 102 of the recipient. The image map can define a plurality of interactive (e.g., clickable) areas, also referred to herein as slices. For instance, the interactive areas can be defined using one or more <area> tags. Each interactive area can overlap or coincide with a corresponding graphical element of the image(s) displayed in the electronic message, when the image map is overlaid over the image(s) within the electronic message. The image map, when overlaid over the image(s) displayed within the electronic message accessed by the recipient, allows the recipient to select a reaction among the possible reactions represented by the graphical elements to be recorded. In a way, the image map transforms static image(s) displayed within the electronic message into interactive image(s) such that different image regions corresponding to different predefined areas or slices of the image map can be selected. In other words, the image(s) displayed within in the accessed electronic message together with the image map overlaid over it/them can be viewed as forming interactive graphical elements. The graphical elements corresponding to different predefined areas or slices of the image map can represent previously recorded reactions or, if no reactions were recoded yet, default or randomly selected reactions.

The software instructions embedded within the electronic message can include (or can receive from the data processing system 106) an identifier of the image (e.g., reaction bar) displayed within the accessed electronic message and/or separate identifiers of the predefined interactive areas or slices of the image map. Upon the recipient (or the user of the client device 102 accessing the electronic message) selects one of the reactions or corresponding graphical elements (e.g., by clicking or tapping on the corresponding display area), the executable instructions can cause the client device 102 to send a request for recording the corresponding reaction to the electronic message. The request can be or can include a request for a page. The request can include the identifier of the image and an indicator of the interactive area of the image map with which the recipient or the corresponding client device 102 interacted.

In the case where multiple interactive images corresponding to separate reactions are displayed in the electronic message, each image can be associated with a corresponding hyperlink (e.g., URL). The URL can include an identifier of the corresponding image. When the recipient interacts with an image of the plurality of images displayed within the electronic message, the client device 102 of the recipient can send a request to the data processing system 106 using the corresponding hyperlink or URL. The data processing system 106 or a server thereof can use the image identifier in the hyperlink or URL to identify or determine the reaction made by the recipient. The reactions depicted by the interactive images can represent reactions previously recorded in association with the electronic message or default/randomly selected reactions if no reactions were recorded yet in association with the electronic message.

In some implementations, the received image(s) can be non-interactive image(s) depicting one or more reactions (e.g., previously recorded or default reactions) and can be displayed with a hyperlink within the electronic message. The recipient can activate the hyperlink to cause display of a corresponding web page, e.g., in a pop-up window. The web page can include a plurality of interactive images corresponding to separate reactions. The recipient can interact with one of the images in the web page, and a server associated with the web page can record the recipient's reaction. The server associated with the web page can be a server of the data processing system 106. The server can maintain a data structure mapping each interactive image in the web page (or an identifier thereof) to the corresponding reaction, and use the data structure to record reactions from various recipients.

Processes and/or steps performed by the software instructions embedded within the electronic message, when executed by the client device 102 accessing the electronic message, are further discussed below with regard to FIGS. 4-7C.

Figure 4:
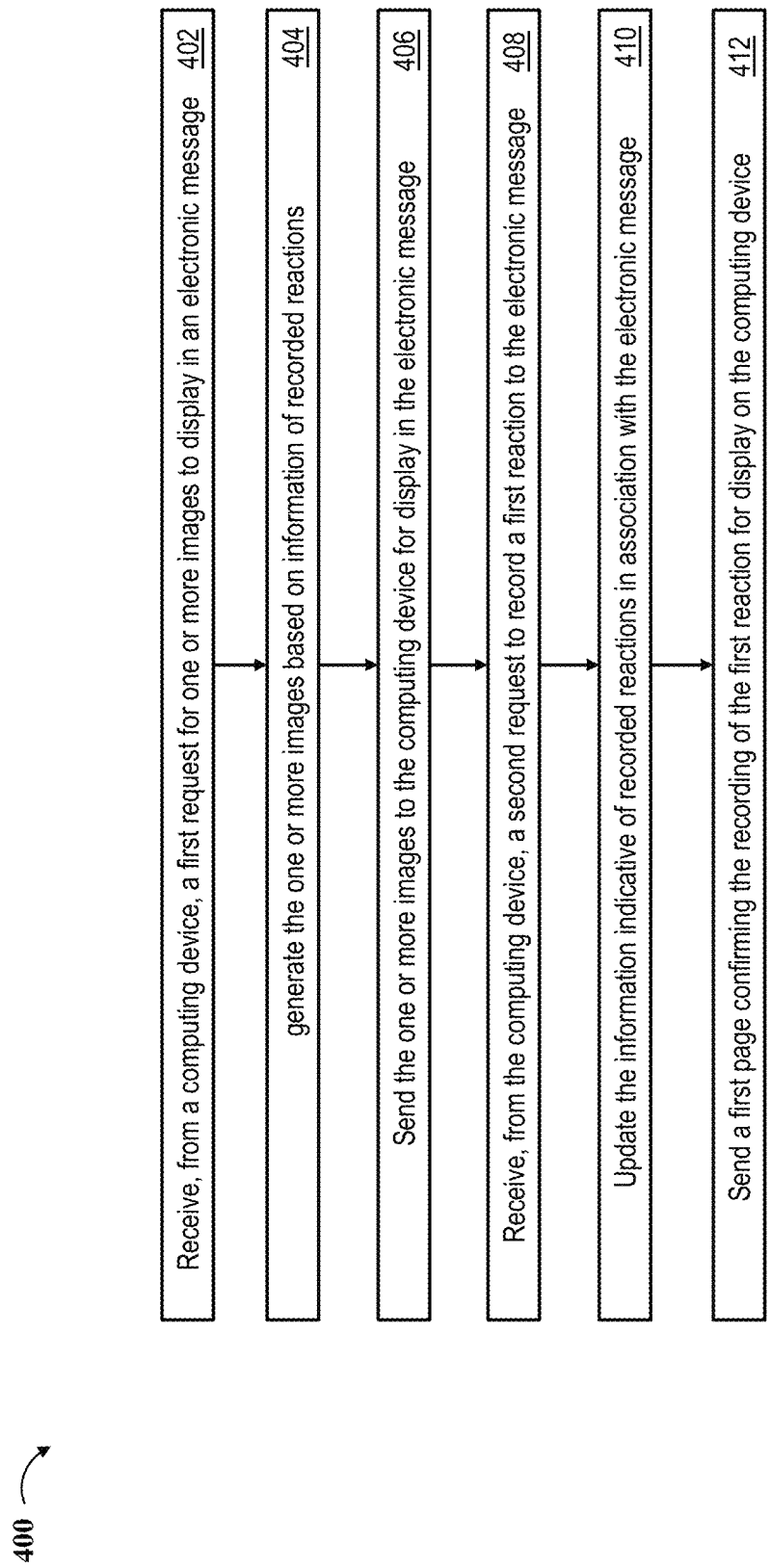
FIG. 4 shows a flowchart illustrating a method for recording reactions to email messages, according to example embodiments.

Referring now to FIG. 4, a flowchart illustrating a method 400 for incorporating reactions in electronic messages (e.g., email messages) is shown, according to example embodiments. In brief overview, the method 400 can include receiving, from a computing device, a first request for one or more images to display in an electronic message (STE 402), generating, responsive to the first request, the one or more images using information indicative of reactions recorded in association with the electronic message (STEP 404), and sending the one or more images to the computing device for display in the electronic message (STEP 406). The method 400 can include receiving, from the computing device, a second request to record a first reaction to the electronic message (STEP 408), updating the information indicative of the reactions recorded in association with the electronic message (STEP 410), and sending a page confirming the recording of the first reaction for display on the computing device (STEP 412).

The method 400 can include the computer system 106 receiving, from a computing device 102 (e.g., of a recipient of the electronic message), a first request for one or more images to display in an electronic message (STE 402). As discussed above with regard to FIG. 2, the electronic message (e.g., email message) can include software instructions embedded therein. The software instructions (e.g., HTML code), when executed by the computing device 102 of the recipient of the electronic message, can cause the computing device 102 to send the first request to the computer 106 in response to the computing device 102 accessing or opening the electronic message (e.g., accessing an email message from recipient's Inbox). The recipient or the corresponding client device 102 can trigger access or opening of the electronic message using a web browser or an application 104 (e.g., email application) running on the client device 102. The software instructions embedded in the electronic message can include a first hyperlink (e.g., URL) that is used by the computing device 102 to request the one or more images to be displayed in the electronic message.

The method 400 can include the computer system 106 generating, responsive to the first request, the one or more images using information indicative of reactions recorded in association with the electronic message (STE 404). The computer system 106 can check or determine whether any reactions were previously recorded in association with the electronic message. The first request (or the corresponding URL) can include an identifier of the electronic message. The computer system 106 can assign or generate the identifier of the electronic message as part of providing the software instructions to the computing device 102 of the sender of the electronic message. If the computer system 106 determines that one or more reactions were previously recorded (e.g., by one or more other recipients of the electronic message) in association with the electronic message, the computer system 106 can generate the one or more images to include graphical elements representing types of previously recorded reactions. The computer system 106 may generate the one or more images may to further depict statistics of the reactions previously recorded in association with the electronic message. The computer system 106 may maintain one or more data structure storing the information indicative of the reactions recorded in association with the electronic message. If the computer system 106 determines that no reaction was recorded in association with the electronic message, the computer system 106 can generate the one or more images to include graphical elements representing default or randomly selected types of recorded reactions.

As discussed above in relation with FIG. 2, the one or more images can be non-interactive or interactive. For instance, the computer system 106 can generate an image map (or instructions to implement an image map) to be overlaid over the one or more images and having one or more interactive areas. Each interactive area of the image map can correspond or can be configured to overlap with a corresponding graphical element of the one or more images when displayed in the electronic message. In generating the one or more images, the computer system 106 can generate interactive images, such that each image is associated with a corresponding hyperlink (or URL). Each image of the one or more images can be associated with corresponding instructions (e.g., HTML executable instructions) and including the corresponding URL. The corresponding instructions can cause the corresponding hyperlink or URL to be sent to the computer system 106 upon the computing device 102 interacting with the image. In some implementations, the one or more images can be non-interactive images to be displayed in the electronic message with a hyperlink of web page. The web page can include interactive graphical elements corresponding to different possible reactions that can be recorded in association with the electronic message.

The method 400 can include the computer system 106 sending the one or more images to the computing device 102 of the recipient for display in the electronic message (STEP 406). Sending the one or more images can include sending the image map (or instructions thereof) to the computing device 102. In the case where the one or more images are interactive images associated with different hyperlinks or URLs, sending the one or more images can include sending the corresponding hyperlinks and/or instructions associated with each interactive image to the computing device 102 of the recipient. In the case of non-interactive image(s) to be displayed with a hyperlink of the web page including interactive graphical elements corresponding to different possible reactions, the computer system 106 can send only the one or more images (e.g., the hyperlink is included in the software instructions embedded in the electronic message) or may further send the hyperlink of the web page to the computing device 102 of the recipient.

Upon receiving the one or more images, the computing device 102 of the recipient can display the image(s) in the electronic message. The image(s) can include one or more graphical elements representing one or more reactions (e.g., emoji reactions). The graphical elements can include emoji graphics, digital animated stickers, sub-images, icons and/or graphical symbols depicting or indicative of possible or available reactions. The software instructions embedded within the electronic message can cause the client device 102 accessing the electronic message to display the received image(s) within the accessed electronic message.

Figure 5A:
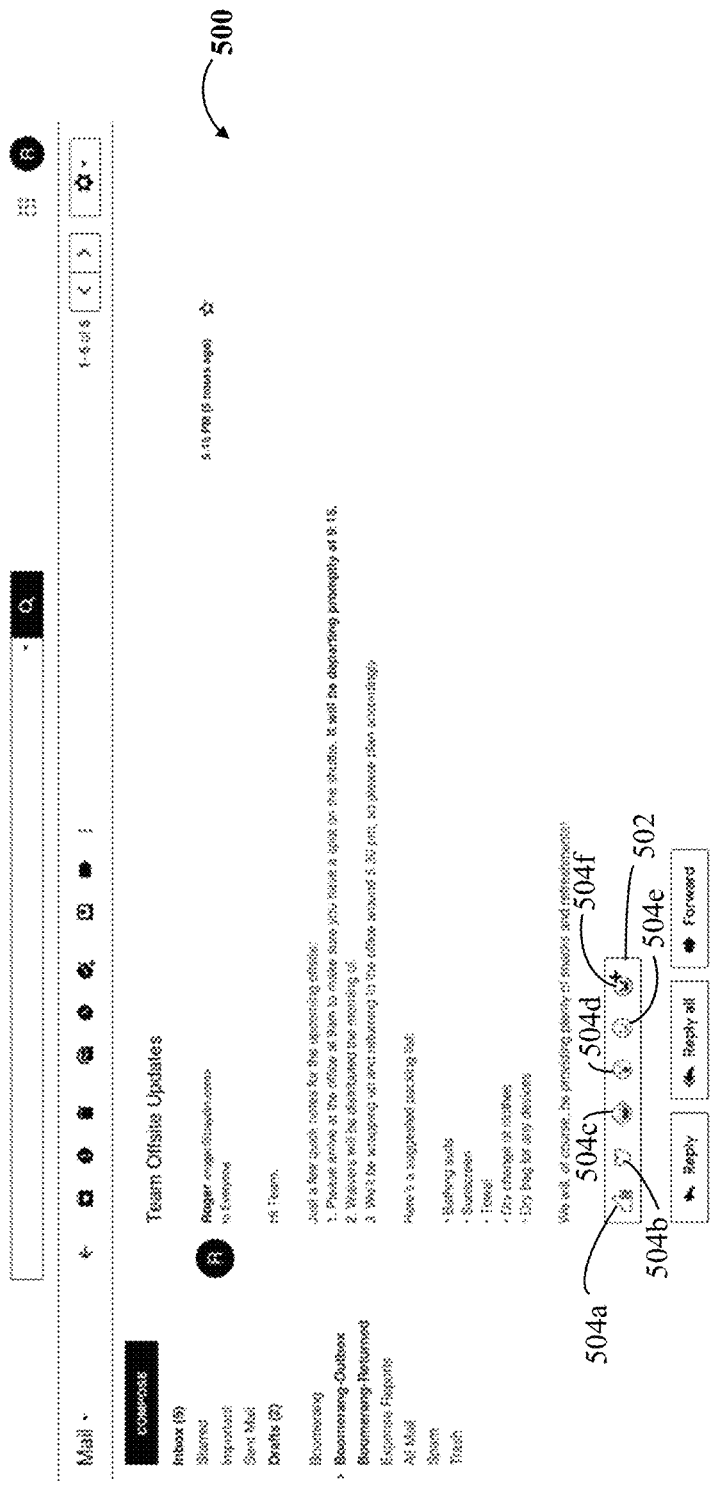
FIG. 5A shows a screenshot of an example email message as displayed on a recipient client device, according to example embodiments.

Referring now to FIGS. 5A-5D, various screenshots of an example email message 500 with reactions incorporated as displayed on a recipient client device 102 are shown, according to example embodiments. FIGS. 5A-5D illustrate different ways of incorporating reactions in email message 500. In FIGS. 5A, the email message 500 includes an image 502 representing the image received from the data processing system 106 and including graphical elements indicative of various possible reactions. The image 502 depicts a reaction graphic or a reaction bar (e.g., emoji reaction bar) including emoji graphics 504a-e. For instance, the emoji graphic 504a depicts a thumb's up reaction, the emoji graphic 504b depicts a heart representing a "love it" reaction, the emoji graphic 504c depicts a smiling face, the emoji graphic 504d depicts a face with open mouth to express surprise or shock, and the emoji graphic 504e depicts a sad face. It is to be noted, that other digital images or graphics, e.g., other emoji graphics such as a smiling face with heart-eyes or digital animated stickers among others, can be used in the image 502 to represent various reactions. The image 502 also includes the graphical element 504f for accessing or viewing additional graphical elements indicative of other reactions beyond those shown in the image 502. The graphical elements 504a-504e can represent types of reaction that were previously recorded in association with the email message 500 or types of reactions selected randomly or by default (e.g., if no reactions were recorded yet in association with email message 500). In some implementations, image 502 can depict statistics of previously recorded reactions. For example, each of the graphical elements 504a-504e can depict a corresponding number representing a number of times the corresponding reaction was recorded in association with email 500.

Figure 5B:
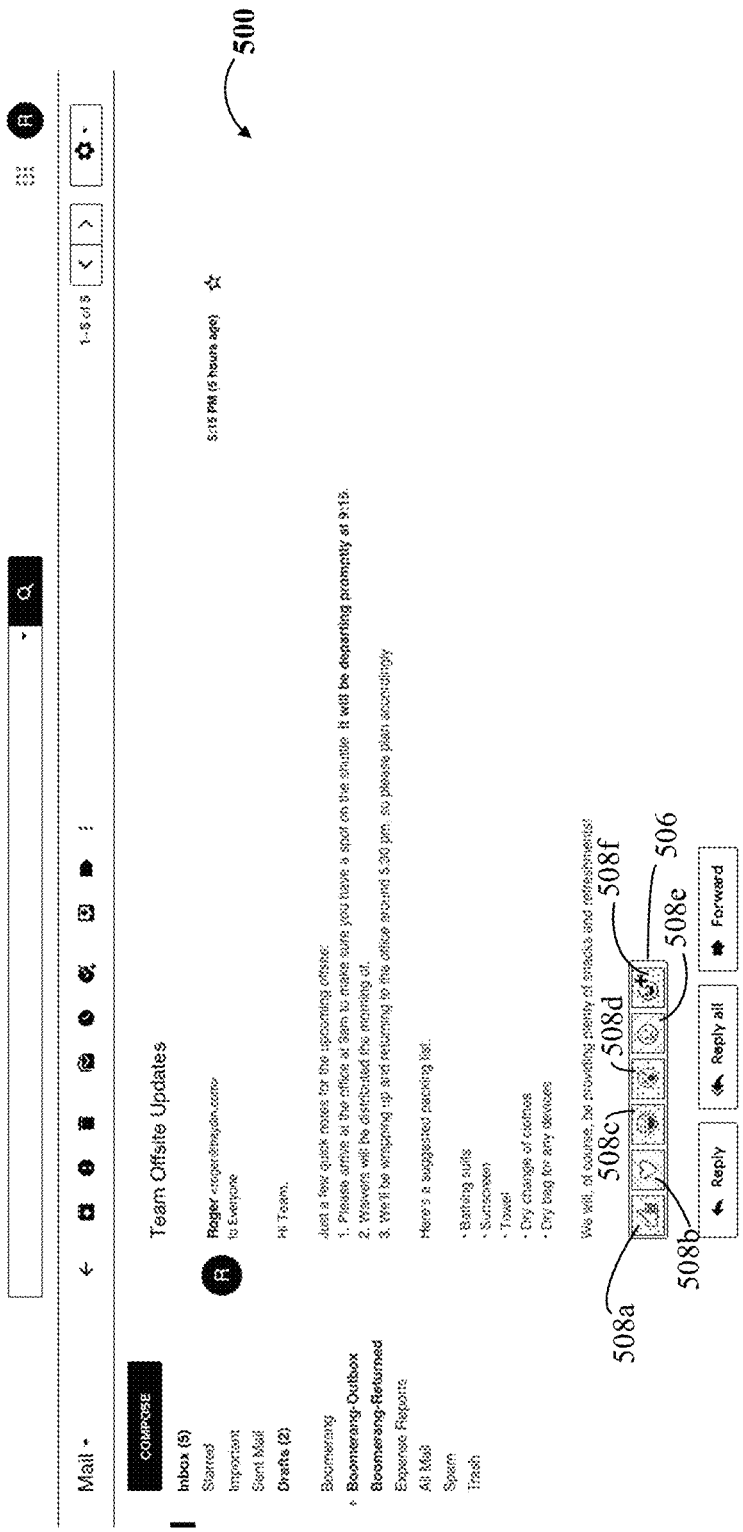
FIGS. 5B and 5C show screenshots of the email message with a pop-up window depicting the requested page of additional reactions are shown, according to example embodiments.

The screenshot in FIG. 5B illustrates an image map 506 that is overlaid over the image (or reaction bar) 502 in the email message 500. The image map 506 includes a plurality of interactive areas 508a-508f. Interactive area 508a overlaps with and is used to interact with graphical element 504a, interactive area 508b overlaps with and is used to interact with graphical element 504b, interactive area 508c overlaps with and is used to interact with graphical element 504c, interactive area 508d overlaps with and is used to interact with graphical element 504d, interactive area 508e overlaps with and is used to interact with graphical element 504e, and interactive area 508f overlaps with and is used to interact with graphical element 504f. The image map 506 and the corresponding interactive areas 508a-508f can be transparent or can be shaded.

The image map 506 can be implemented via the software instructions embedded within the email message 500 or can be implemented via a piece of code received from the data processing system 106 with image 502. In either case, the software instructions or the piece of code cause image map 506 to be overlaid over the image 502 displayed within email message 500 when the email message 500 is accessed and displayed by the recipient client device 102. The recipient can interact with (e.g., click or tap) any of the interactive areas 508a-508e of the image map to select the corresponding graphic element, e.g., any of emoji graphics 504-504e in the image 502. Responsive to the recipient's selection, the software instructions embedded within the email message 500 and executed by the client device 102 of the recipient can cause the client device 102 to detect the selection and, in response, send a request to the data processing system 106 to record or register the selected reaction.

Figure 5C:
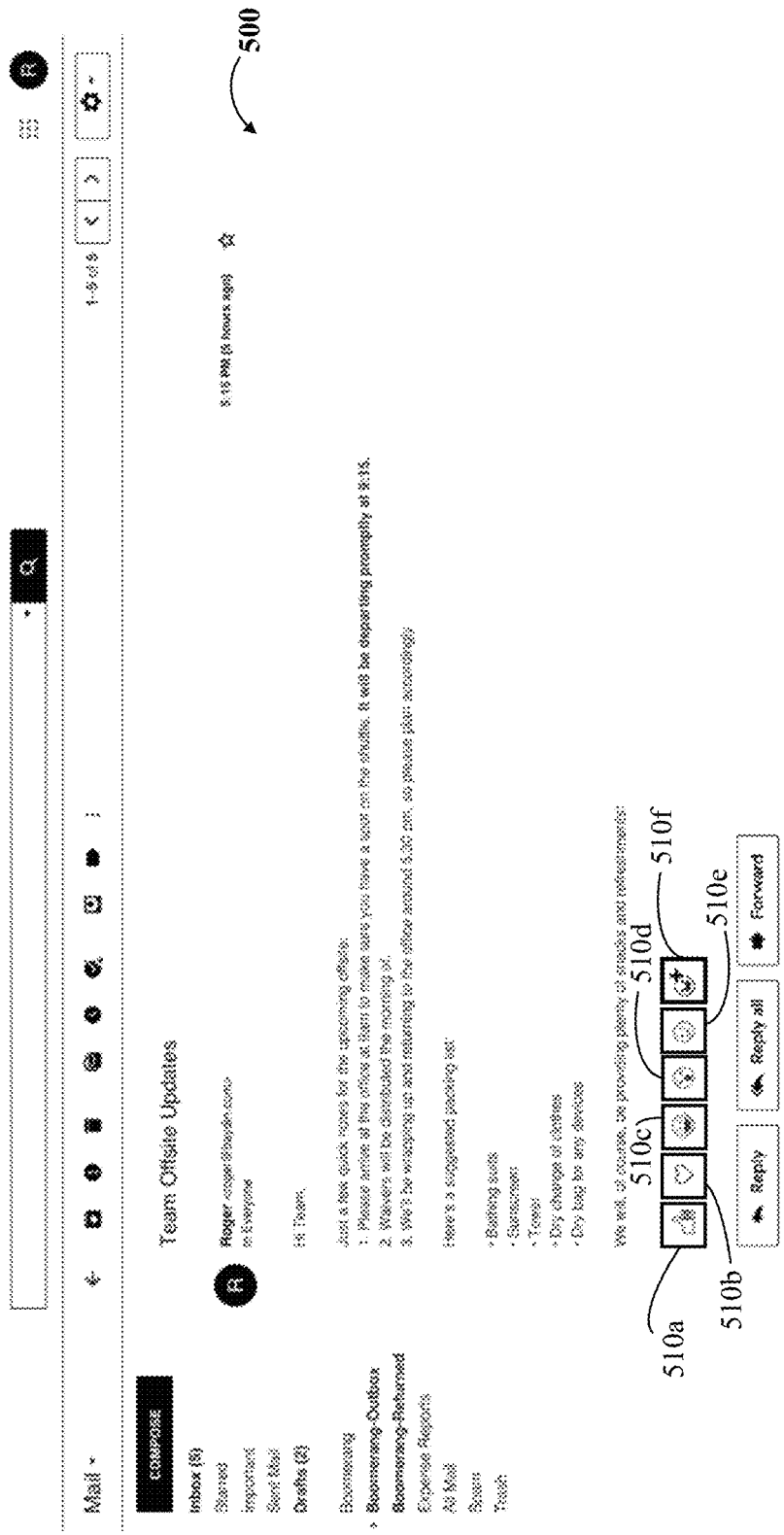

In FIG. 5C, the email message 500 includes multiple interactive images 510a-510f displayed therein. Each of the images 510a-510e depicts a corresponding reaction, while image 510f depicts a symbol indicative of additional reactions that can be accessed, e.g., via a link of web page. Each of the images 510a-510e can be associated with a corresponding link and corresponding instructions. The recipient computing 102 can receive images 510a-510e and corresponding executable instructions (e.g., HTML instructions) from the data processing system 106. For each image of images 510a-510e, the corresponding instructions can be executed by the computing device 102 accessing the email message 500 upon the computing device 102 interacting with the image to send a request to the data processing system 106 to record the reaction corresponding to the image. The request to record the interaction is sent using the corresponding link, which can be a link of a confirmation page and can include an identifier of the image with which the computing device 102 interacted. Images 510a-510e can depict types of reactions previously recoded in association with the email message 500, or may depict default or randomly selected reactions if no reactions were recorded yet in association with email message 500. In some implementations, images 510a-510e may further depict statistics of recorded reactions (e.g., number of times different types of reactions have been recorded).

Figure 5D:
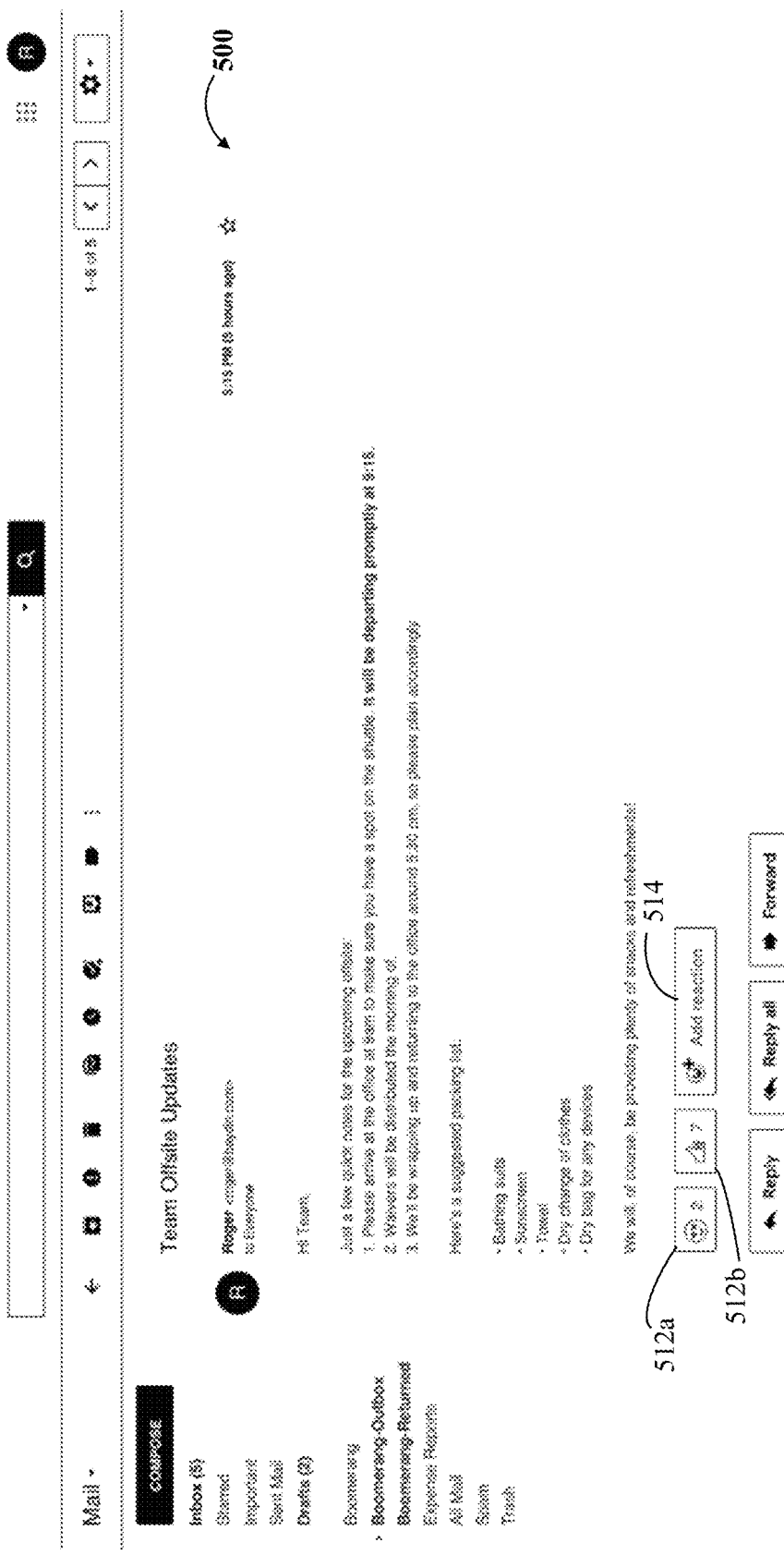
FIG. 5D shows a screenshot of an example email message with multiple images depicting separate emoji reactions displayed therein, according to example embodiments.

The screenshot in FIG. 5D depicts the case where non-interactive images 512a and 512b and a hyperlink 514 are displayed in email message 500. The images 512a and 512b can depict types and statistics of reactions previously recorded in association with the email message 500. The hyperlink 514 represents a link of webpage that can be used to record reactions to the email message 500. The web page associated with hyperlink 514 can include a plurality of interactive content items representing various possible reactions. The computing device 102 accessing the email message 500 can interact with the hyperlink 514 to access the interactive content items representing various possible reactions, and select a reaction among the possible reactions. The computing device 102 accessing the email message 500 can receive the images 512a and 512b from the data processing system 106, whereas the hyperlink 514 can be included in the software instructions embedded in the email message 500 or can be received from the data processing system 106.

The method 400 can include the data processing system 106 receiving a second request, from the recipient client device 102, to record or register a reaction to the electronic message (STEP 408). The computer system 106 can receive, from the computing device 102 accessing the electronic message, a second request for recording the reaction to the electronic message, responsive to the computing device 102 interacting with an interactive element rendered in the electronic message. Referring back to FIGS. 5A-5D, the interactive element can include an interactive area, e.g., among interactive areas 508a-508f, of image map 506, an interactive image of interactive images 510a-510f or hyperlink 514. The second request can be a request for a page and can include an indicator of the reaction to be recorded.

In the case where an image map is overlaid over one or more images displayed in the electronic message as shown in FIGS. 5A and 5B, the request to record the reaction can include an identifier of the image (or the reaction bar) 502 and an identifier of the interactive area or slice (among interactive areas 508a-508e) of the image map 506 with which the recipient or the respective client device 102 interacted. The identifier of the image depicting the graphical elements indicative of various reactions, such as image 502, and/or the identifiers of separate interactive areas or slices 508a-508e of the image map 506 can be received from the data processing system 106 (e.g., with image 502 and as part of executable instructions of the image map 506). Each interactive area or slice, e.g., among areas 508a-508d, of the image map 506 can have a corresponding identifier. The software instructions initially embedded in the electronic message or executable instructions of the image map 506 can cause the client device 102 to detect the interactive area of the image map that the recipient interacted with, and include the corresponding identifier in the request to record the reaction associated with interactive area with which the client device 102 interacted.

In some implementations, each interactive area of the image map can be associated with a corresponding link or URL. The URLs can be provided by the data processing system 106, e.g., as part of image map. Each URL can include the identifier of the image 502 and the identifier of the corresponding interactive area of the image map. The software instructions initially embedded in the electronic message and/or instructions associated with the image map 506 can detect interaction with a given interactive area of the image map 506, and in response send the corresponding URL to the data processing system 106. In some implementations, a URL may be included in the software instructions initially embedded in the electronic message, and the computing device 102 may append the URL with the identifier of the image 502 and the identifier of the interactive area of the image map with which the computing device 102 interacted. The URL can point to a server of the data processing system 106 associated with reaction recorder 114, and can represent the request to record the reaction.

In the case where multiple images are received and displayed in the electronic message as shown in FIG. 5C, the interactive element can be one of the interactive images 510a-510f. The request to record the reaction can include an identifier of the interactive image with which the computing device interacted. The request can be, or can include, the link or URL corresponding to the interactive image with which the computing device interacted. The link or URL can include, or can be appended to include, identifier of the interactive image with which the computing device interacted. The request, in general, can include an identifier.

In the case where non-interactive images are displayed in the electronic message with a hyperlink of a web page as shown in FIG. 5D, the interactive element can be the hyperlink 514. In response to an interaction with the hyperlink 104, the computing device 102 can send a request for the corresponding web page. The computer system 106 or server can provide, the web page responsive to the request, and computing device can display the received web page. The computing device 102 can interact with an interactive content item in the web page representing a reaction, and the web page can cause the computing device 102 to send a request to the computer system 106 to record the reaction. The request to record the reaction can include an identifier of the interactive content item with which the computing device 102 interacted. As such, receiving the request for recording the first reaction, includes receiving, from the computing device 102, a request for the web page corresponding to the hyperlink (responsive to the computing device 102 interacting with the hyperlink 514 rendered in the email message), providing, responsive to the request, the web page to the computing device 102 for display, and receiving, from the computing device 102, the request for recording the reaction to the electronic/email message responsive to the computing device 102 interacting with an interactive content item of the plurality interactive content items in the web page corresponding to the hyperlink (e.g., hyperlink 514).

In some implementations, the request to record can include a session cookie. For instance, if the electronic or email message is accessed via a browser, the web server providing the web site associated with the email message can send a cookie to the browser. The client device 102 can retrieve the cookie from the browser cache and include the cookie in the request to record the reaction to be sent to the data processing system 106.

The data processing system 106 or the reaction recorder 114 can receive the request to record. The request to record can be or can include a request for a page or web page. The requested page can be a page confirming successful recording or registration of the reaction.

In some implementations, the recipient may be interested in a reaction that is not depicted in the image 502 or in the interactive images 510a-510e. The recipient or the corresponding client device 102 can interact with the interactive area 508f (when the image map 506 is used) or with the interactive image 510f (when multiple interactive images are used). Interaction with the interactive area 508f of the image map 506 causes the computing device 102 to send a request for a web page including additional graphical elements (or interactive content items) representing additional reactions. Similarly, interaction with the interactive image 510f causes the computing device 102 to send a request for a web page including additional graphical elements (or interactive content items) representing additional reactions. The request for the webpage can be a URL pointing to a web page associated with the data processing system 106. The data processing system 106 can receive the request for the page, and provide the page to the client device 102 for display, e.g., in a pop up window.

Figure 6A:
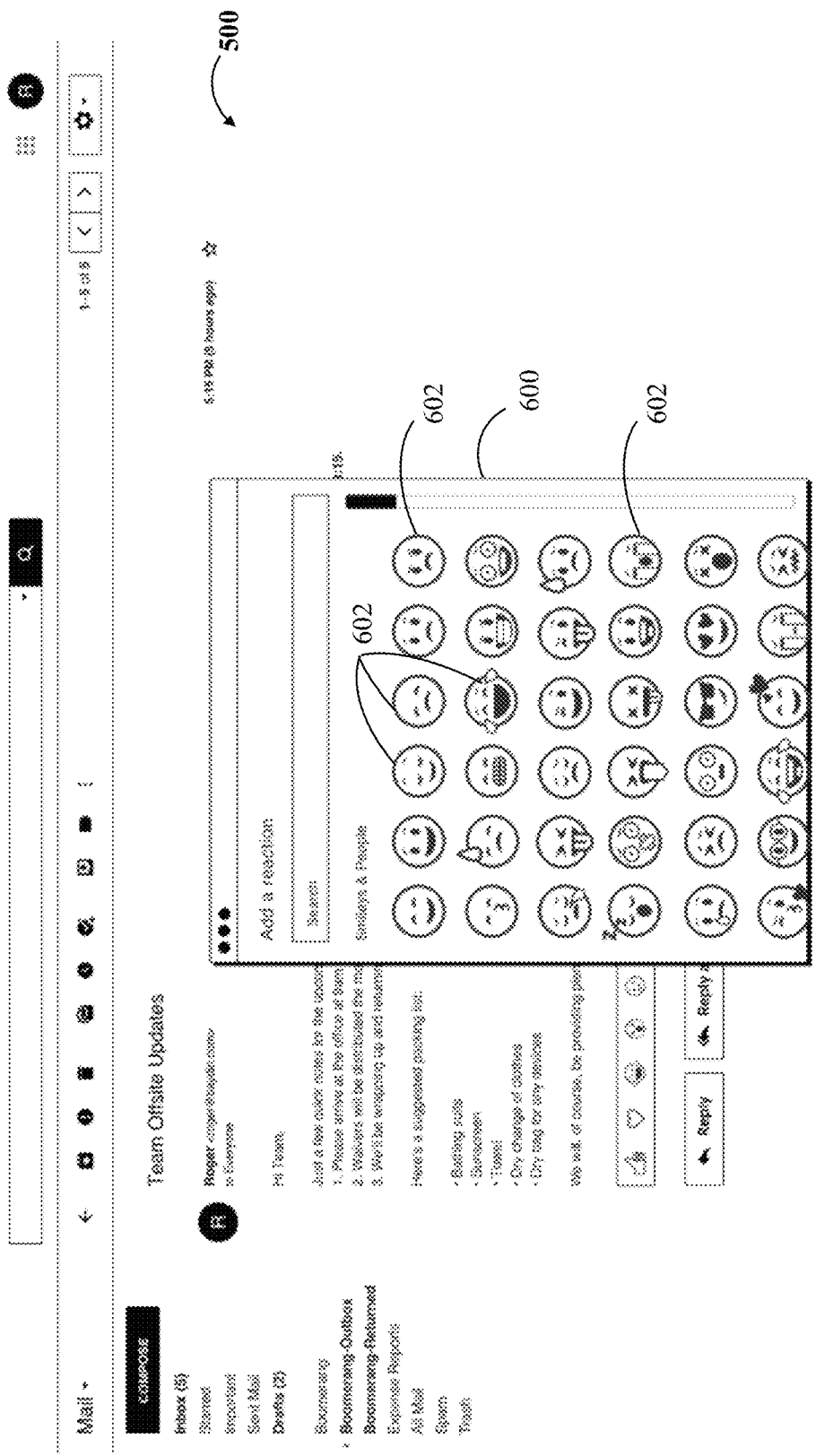
FIGS. 6A-6B show screenshots of the email message with pop-up windows depicting pages confirming successful recording of a reaction, according to example embodiments.
Figure 6B:
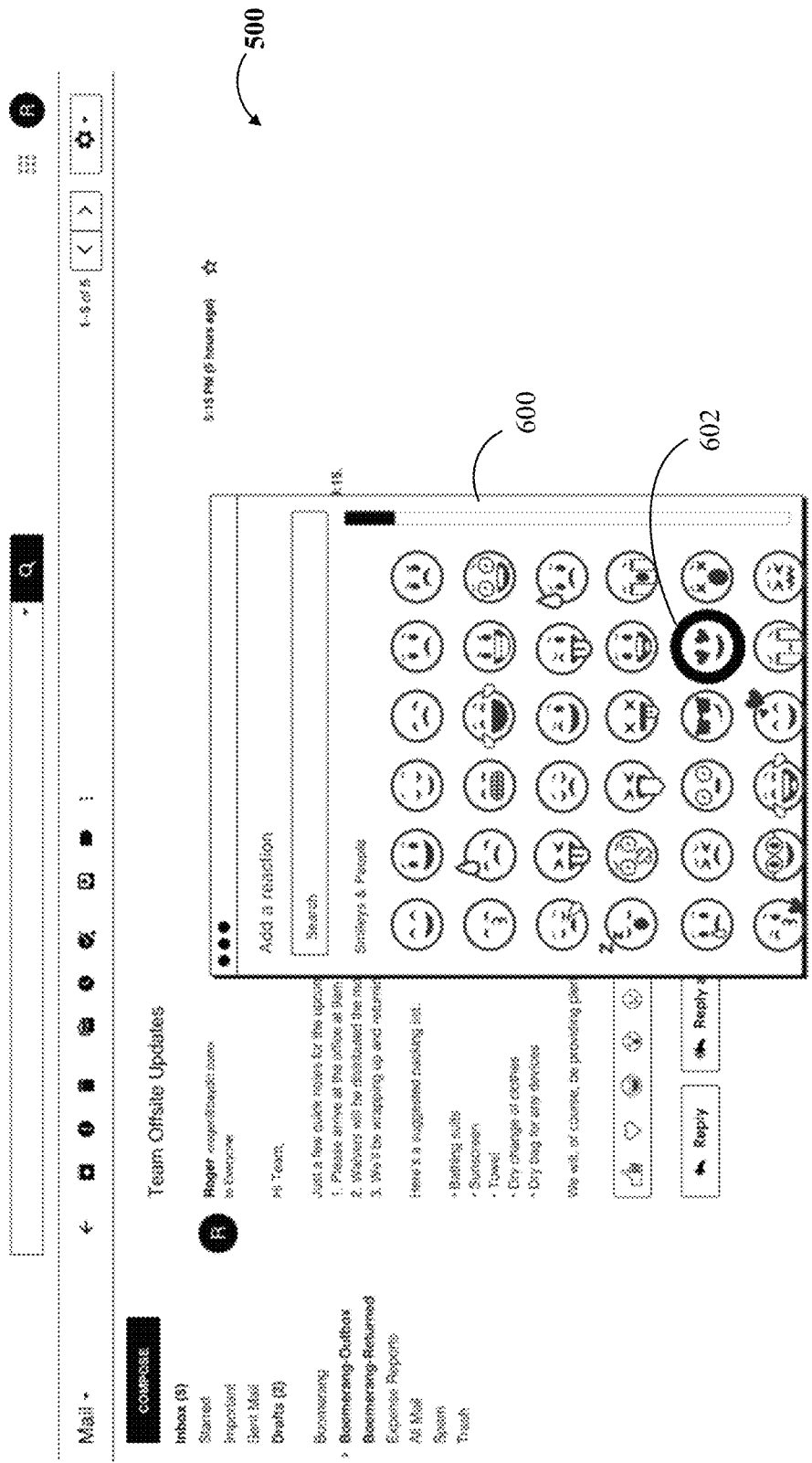

Referring now to FIGS. 6A and 6B, screenshots of the email message 500 with a requested page 600 of additional reactions are shown, according to example embodiments. The client device 102 can receive the requested page 600 from the data processing system 106 and display the page in a pop-up window. The web page 600 depicts various interactive items (e.g., interactive images, interactive icons or interactive graphical symbols or items among others) 602 representing additional reactions, e.g., beyond those shown in the image 502. The recipient can select or interact with (e.g., click or tap) one of the interactive items 602 depicted in the web page 600. For instance, FIG. 6B shows an example interaction with or selection of the interactive item depicting a smiling face with heart-eyes. Responsive to the selection of the interactive item, the client device 102 can send a request for recording the selected reaction as discussed above. In some implementations, the recipient can select multiple reactions.

The page 600 shown in FIGS. 6A and 6B is typically displayed responsive to interacting with the interactive area 508f of the image 506 of FIG. 5B. However, a similar page can be displayed by the computing device 102 in response to interacting with the interactive image 510f of FIG. 5C or interacting with the hyperlink 514 of FIG. 5D. In all these cases, the recording of a reaction can be achieved by interacting with one of the interactive contentment items (or graphical elements) of the displayed page.

Upon receiving the request to record the reaction, the computer system 106 can identify the type of the reaction using one or more identifiers or indicators of the interactive element with which the computing device 102 interacted. For instance, when an image map 506 is used as described in relation with FIGS. 5A and 5B, the data processing system 106 can use the identifier of the image 502 and the identifier of the interactive area of the image map 506 received in the request to record the reaction to identify the type of reaction to be recorded. The data processing system 106 or the reaction recorder 114 can maintain a mapping, e.g., in a data structure such a lookup table, between identifiers of the interactive areas 508a-508e of the image map 506 and corresponding graphical elements or reactions in the image 502 displayed in the email message 500. The data structure can associate each interactive area identifier with the corresponding graphical element or reaction. The reaction recorder 114 can maintain multiple data structures or lookup tables each associated with a corresponding image displayed in a corresponding email message of a plurality of email messages (e.g., email messages associated with different senders, different recipients and/or different content). Each data structure or lookup table can be associated with or mapped to the identifier of the corresponding image (e.g., reaction bar). The reaction recorder 114 can identify the proper data structure or lookup table to use based on the identifier of the image received in the request to record the reaction (e.g., within the URL). Once the data structure is identified, the reaction recorder 114 can identify the type of reaction (or the corresponding graphical element) selected by the recipient using the identified data structure and the identifier of the interactive area of the image map received within the request to record the reaction.

In the case where multiple interactive images, such as images 510a-510e of FIG. 5C, are used, the data processing system 106 can determine the type of reaction to be recorded using the identifier of the interactive image in the request. In the case where a hyperlink, such as hyperlink 514 of FIG. 5D, is used, the data processing system 106 can determine the type of reaction to be recorded using the identifier of the interactive content item included in the request.

The method 400 can include the computer system 106 updating the information indicative of the reactions recorded in association with the electronic message (STEP 410). The computer system 106 can update, responsive to the request to record the reaction, the information indicative of the reactions recorded in association with the email message to account for the reaction identified based on the request. The data processing system 106 or the reaction recorder 114 can keep track of reactions made in association with each electronic message and maintain data records indicative of such reactions. Upon identifying the type of reaction selected by the recipient, the data processing system 106 or the reaction recorder 114 can update the corresponding data record(s) to take into account the reaction selected by the recipient. For instance, the data processing system 106 or the reaction recorder 114 can increment a counter associated with the identified type of the reaction. The data records can include indications of the number of times each available reaction was selected by various recipients of the electronic message.

The data processing system 106 or the reaction recorder 114 can identify the corresponding data record(s) using, for example, the identifier(s) or indicator(s) in the request to record the reaction. In some implementations, the identifier of the image 502, the identifier of the interactive area (e.g., among interactive areas 508a-508e) of the image map 506 or other indicators of the reaction to be recorded can be specific to the electronic/email message. For instance, each electronic/email message incorporating reactions can be assigned a different image identifier, different image map identifier and/or different interactive image identifiers compared to other electronic/email messages.

The method 400 can include sending a page confirming the recording of the reaction for display on the computing device (STEP 412). The data processing system 106 or the reaction recorder 114 can maintain multiple web pages each of which associated with a corresponding reaction (or the graphical element representing the reaction). For instance, each web page can include content confirming successful recording or registration of the corresponding reaction. The data processing system 106 or the reaction recorder 114 can select the web page to send to the client device 102 based on the identified type of the reaction at step 404. The data processing system 106 or the reaction recorder 114 can send the selected or identified web page to the client device 102 to confirm successful recording or registration of the reaction selected by the recipient. Upon receiving the web page, the client device 102 can display the web page, e.g., in a pop-up window. The one or more processors can send the first page to the computing device for display. The first page can confirm the recording of the first reaction to the email message.

Figure 7A:
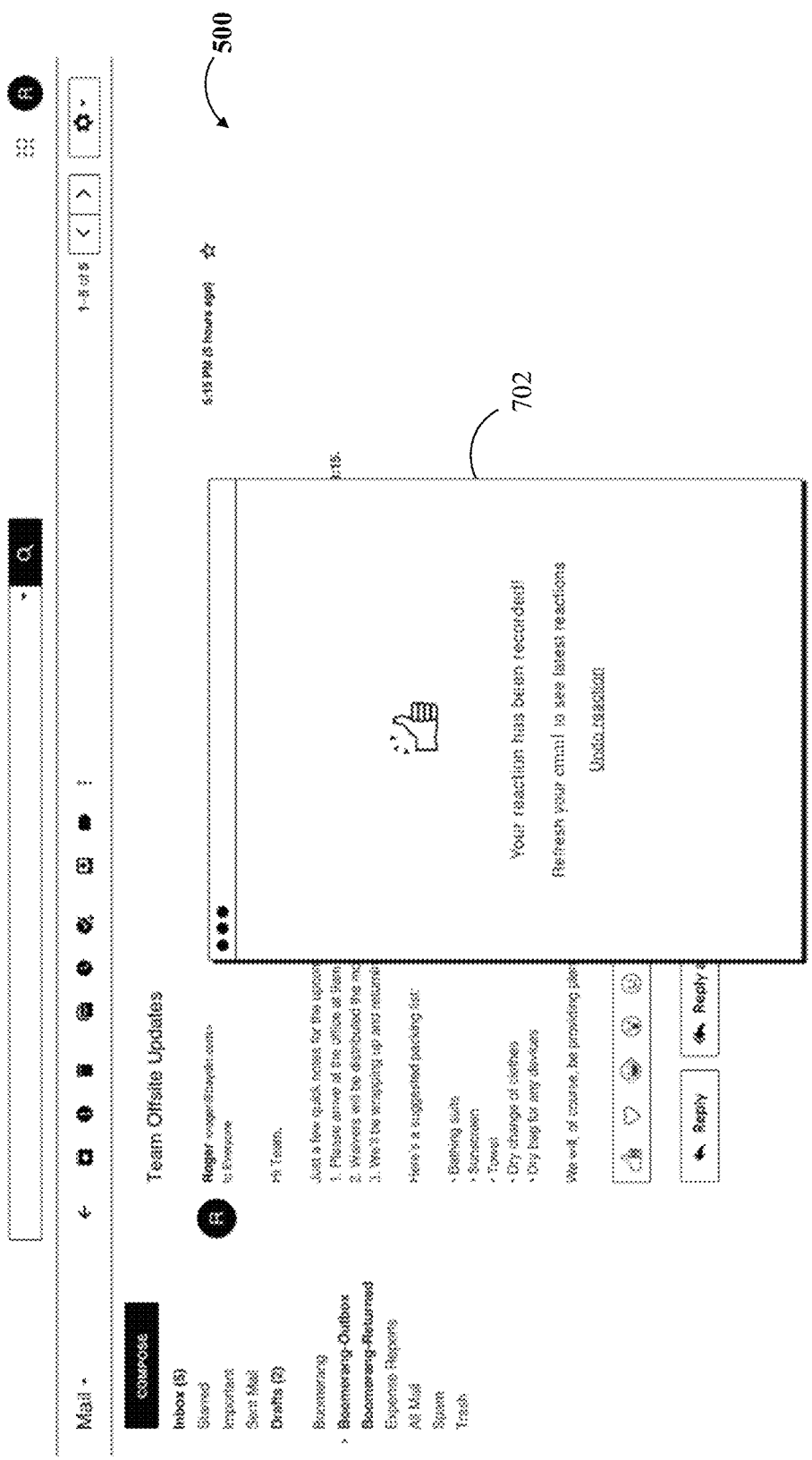
FIGS. 7A-7C show screenshots of the email message with an updated image of available reactions, according to example embodiments.
Figure 7B:
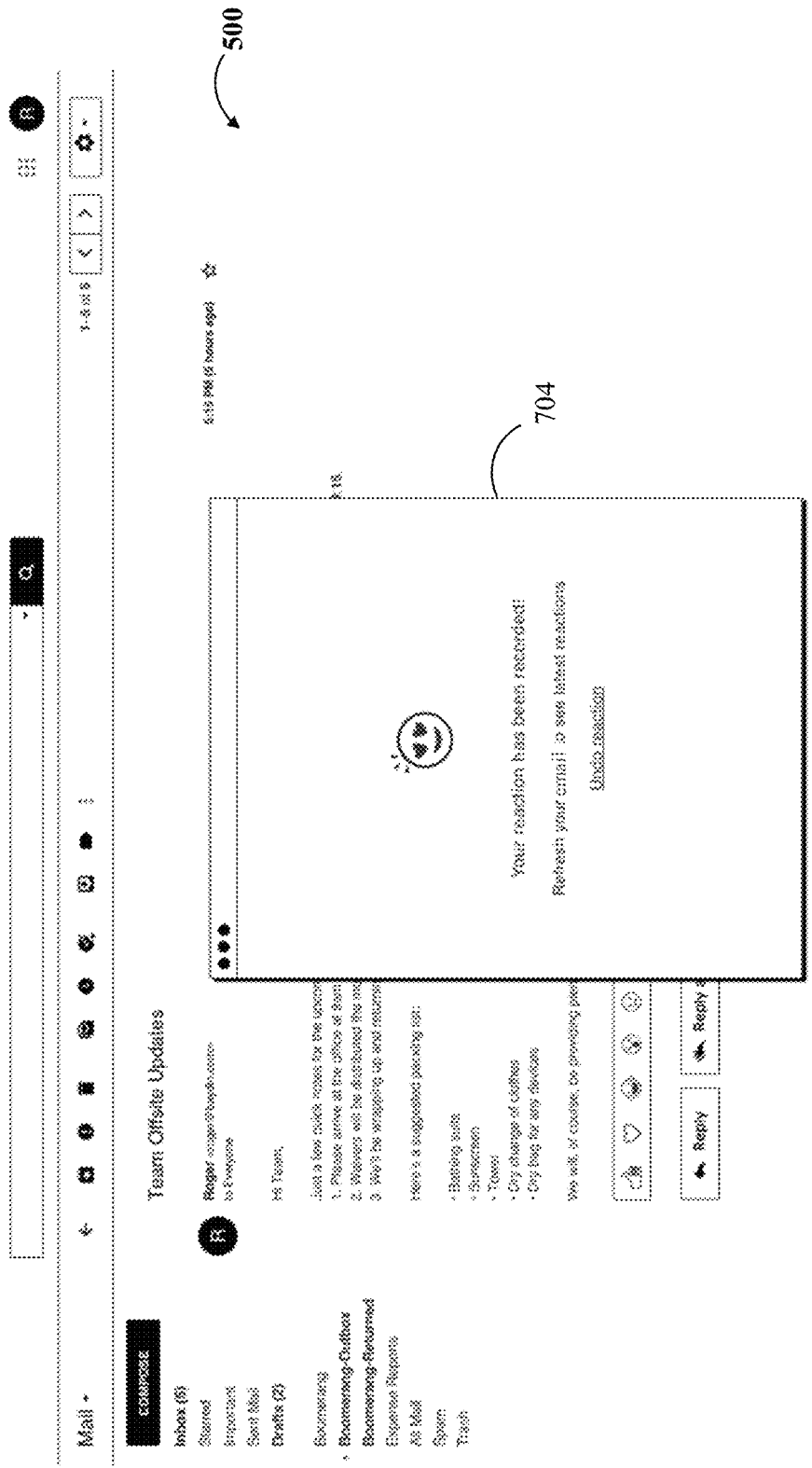
Figure 7C:
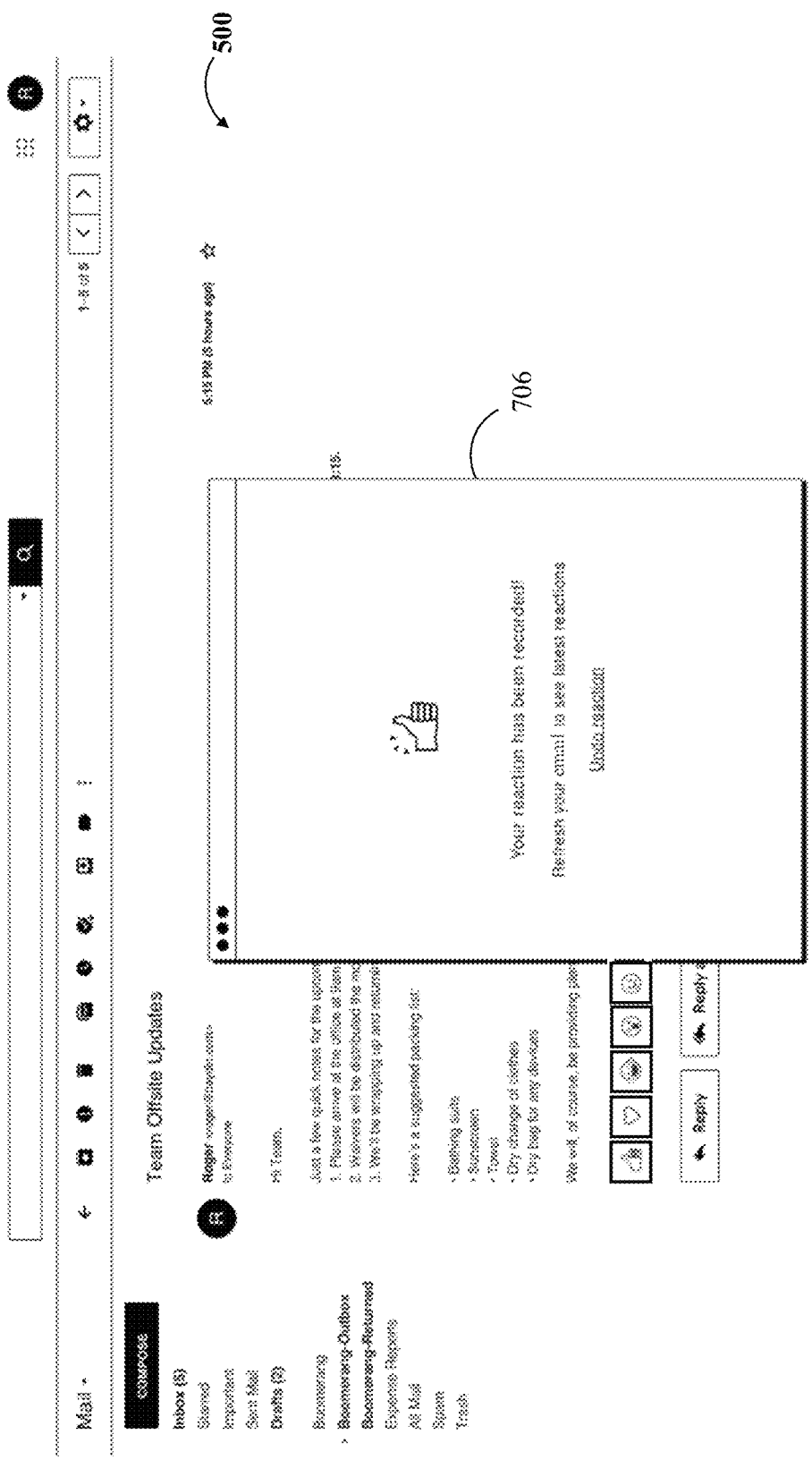

Referring now to FIGS. 7A-7C, screenshots of the email message 500 with web pages 702, 704 and 706 confirming successful recording of the reaction are shown, according to example embodiments. The web pages 702, 704 and/or 706 can be displayed in pop-up windows. FIG. 7A depicts a web page confirming the selection of a "thumb's up" reaction. For example, the web page 702 can be sent by the data processing system 106 responsive to the recipient selecting graphical element 504*a* of image 502 in FIG. 5A or interacting with corresponding interactive area 508*a* of FIG. 5B. The web page 704 confirms the selection of a "smiling face with heart-eyes" reaction or graphical symbol. For example, the web page 704 can be sent by the data processing system 106 responsive to the recipient selecting interactive content item 602 from web page 600 of FIG. 6B. The web page 706 depicts a confirming the recording of a "thumb's up" reaction responsive to interaction with interactive image 510*a* of FIG. 5C.

The recipient or the corresponding client device 102 can refresh the electronic/email message 500 after receiving the confirmation that the selected reaction(s) was/were recorded or registered. In response, the executable instructions embedded in the email message can cause the client device 102 of the recipient to send another request for the image(s) depicting recorded reactions. The data processing system 106 can receive the request sent by the client device 102 responsive to refreshing the email message 500. Given that some reactions were recorded in relation with electronic email message, the image generator 116 can generate new image(s) using, at least in part, the updated information indicative of recorded reactions. The generated image(s) can depict at least part of the updated information indicative of recorded reactions. For instance, the generated image(s) can depict the number of times each reaction was recorded or registered. In some implementations, the generated image(s) can depict only reactions or corresponding graphical elements that were recorded at least once. In some implementations, each instance of the generated instances of the multiple images depicts a corresponding updated number of recorded reactions. The data processing system 106 can then send the generated image(s) to the client device 102 of the recipient for display in the refreshed instance of the email message, and the client device 102 can display the received image in the refreshed instance of the email message.

In some implementations, the data processing system 106 can receive a request for the image(s) depicting various reactions (associated with the electronic/email message) from another recipient or the corresponding client device 102. For instance, the other recipient can access the electronic/email message from a respective email account, and in response, the corresponding client device 102 can send a request for the image to the data processing system 106. Given that some reactions were recorded in relation with electronic/email message, the image generator can generate one or more new images using, at least in part, the updated information indicative of recorded reactions. The generated image(s( )can depict at least part of the updated information indicative of recorded reactions. For instance, the generated image(s) can depict the number of times each reaction was recorded or registered. In some implementations, the generated image(s) can depict only reactions or corresponding graphical elements that were recorded at least once. The data processing system 106 can then send the generated image(s) to the client device of the second recipient for display in the instance of the email message accessed by that client device 102. Upon receiving the generated image, the client device 102 of the second recipient can display the received image in the instance of the email accessed by the second recipient.

Figure 8:
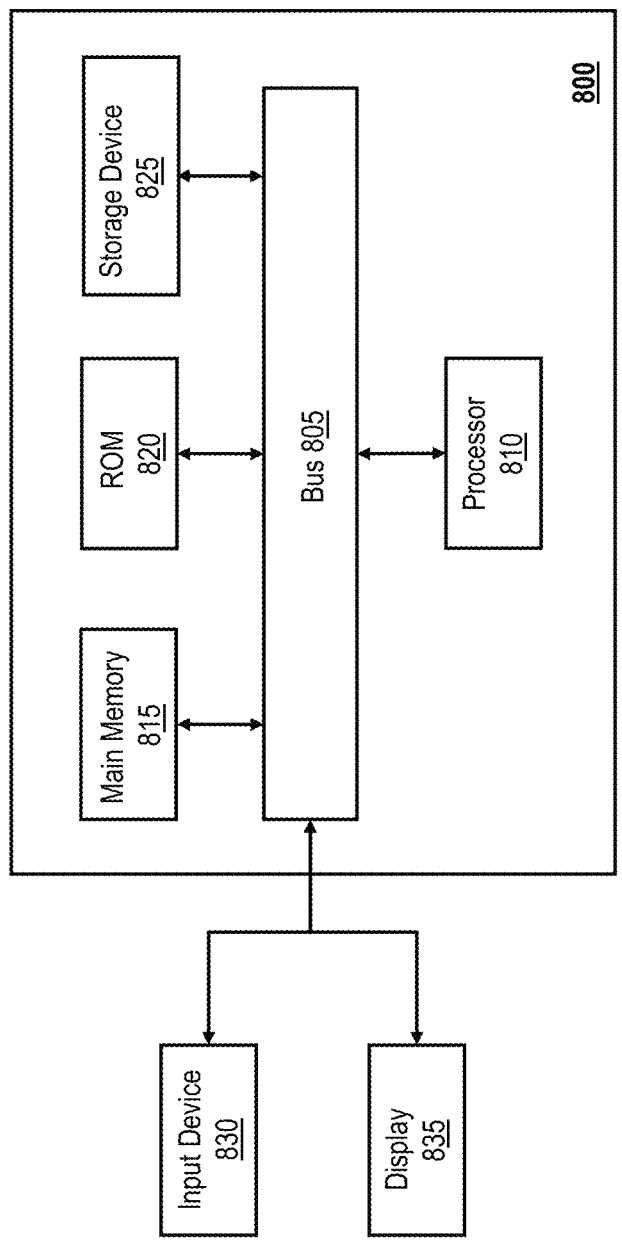
FIG. 8 is a block diagram depicting an implementation of a general architecture for a computer system that may be employed to implement various elements of the systems and methods described and illustrated herein.

FIG. 8 is a block diagram of a computer system 800 that can be used to implement the client device 102, the computer server(s) of the data processing system 106, the email servers 108 and other components described herein. The computing system 800 includes a bus 805 or other communication component for communicating information and a processor 810 coupled to the bus 805 for processing information. The computing system 800 can also include one or more processors 810 coupled to the bus for processing information. The computing system 800 also includes main memory 815, such as a RAM or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a ROM 820 or other static storage device coupled to the bus 805 for storing static information and instructions for the processor 810. A storage device 825, such as a solid state device, magnetic disk or optical disk, is coupled to the bus 805 for persistently storing information and instructions. Computing device 800 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 800 may be coupled via the bus 805 to a display 835, such as a Liquid Crystal Display (LCD), Thin-Film-Transistor LCD (TFT), an Organic Light Emitting Diode (OLED) display, LED display, Electronic Paper display, Plasma Display Panel (PDP), or other display, etc., for displaying information to a user. An input device 830, such as a keyboard including alphanumeric and other keys, may be coupled to the bus 805 for communicating information and command selections to the processor 810. In another implementation, the input device 830 may be integrated with the display 835, such as in a touch screen display. The input device 830 can include a cursor control, such as a mouse, a trackball, or cursor direction keys, for communicating direction information and command selections to the processor 810 and for controlling cursor movement on the display 835.

According to various implementations, the processes or methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 85 causes the computing system 800 to perform the illustrative processes or method ACTs described herein. One or more processors in a multi-processing arrangement may also be employed to execute the instructions contained in main memory 815. In alternative implementations, hard-wired circuitry may be used in place of or in combination with software instructions to effect illustrative implementations. Thus, implementations are not limited to any specific combination of hardware circuitry and software.

Although an implementation of a computing system 800 has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computer server", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication (e.g., a communication network). Examples of communication networks include a local area network and a wide area network, an inter-network (e.g., the Internet), and peer-to-peer networks (e.g., ad hoc peer-to-peer networks).

The computing system such as the data processing system 106 can include clients and servers. For example, the data processing system 106 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the computing devices or servers described herein can be single modules, logic devices having one or more processing modules, one or more servers, or part of a cloud computing environment.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for overlaying calendar information in electronic messages, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:
one or more processors; and
at least one memory storing computer-executable instructions, the computer-executable instructions when executed by the one or more processors cause the one or more processors to:
receive, from a computing device, a first request for one or more images to be displayed in an email message responsive to the computing device opening the email message, wherein software instructions embedded in the email message cause the computing device to send the first request responsive to the computing device opening the email message;

generate, responsive to the first request, the one or more images using information indicative of reactions recorded in association with the email message;

send the one or more images to the computing device for display in the email message, the one or more images when displayed in the email message depict one or more first graphical elements representing one or more reactions to the email message;

receive, from the computing device, a second request for recording a first reaction to the email message responsive to the computing device interacting with a first interactive element rendered in the email message, the second request being a request for a first page and including an indicator of the first reaction, and wherein the second request comprises at least one of: (i) a uniform resource locator including the indicator of the first reaction or (ii) a session cookie of the computing device;

update, responsive to the second request, the information indicative of the reactions recorded in association with the email message to account for the first reaction; and send the first page to the computing device for display, the first page confirming the recording of the first reaction to the email message.

2. The system of claim 1, wherein the first interactive element includes an image map overlaid over the one or more images when displayed within the email message.

3. The system of claim 2, wherein the indicator of the first reaction includes an identifier of the image map and an identifier of a first interactive area, of a plurality of interactive areas of the image map, with which the computing device interacted, wherein each graphical element of the one or more first graphical elements represents a corresponding reaction and is associated with a corresponding interactive area of the plurality of interactive areas of the image map, and wherein the computer-executable instructions when executed by the one or more processors further cause the one or more processors to identify the first reaction using the identifier of the image map and the identifier of the first interactive area of the image map.

4. The system of claim 1, wherein the one or more images include one or more interactive images, each interactive image depicting a corresponding graphical element of the one or more first graphical elements and representing a corresponding reaction of the one or more reactions, and wherein the first interactive element includes a first interactive image of the one or more interactive images.

5. The system of claim 4, wherein each interactive image is associated with a respective link including an identifier of the interactive image, and wherein the one or more processors are configured to:

receive a first link associated with the first interactive image upon the computing device interacting with the first interactive image, the first link representing the second request and including an identifier of the first interactive image; and identify the first reaction based on the identifier of the first interactive image.

6. The system of claim 1, wherein the first interactive element includes a link indicative of a second page including a plurality of interactive content items representing a plurality of reactions, and wherein in receiving the second request for recording the first reaction, the one or more processors are configured to:

receive, from the computing device, a third request for the second page responsive to the computing device interacting with the link rendered in the email message;

provide, responsive to the third request, the second page to the computing device for display; and receive, from the computing device, the second request for recording the first reaction to the email message responsive to the computing device interacting with an interactive content item of the plurality of interactive content items in the second page.

7. The system of claim 1, wherein the one or more images when displayed in the email message further depict a second graphical element indicative of a second page including one or more interactive content items representing one or more additional reactions.

8. The system of claim 7, wherein in receiving the second request for recording the first reaction, the one or more processors are configured to:

receive, from the computing device, a third request for the second page responsive to the computing device interacting with the first interactive element rendered in the email message;

provide, responsive to the third request, the second page to the computing device for display; and receive, from the computing device, the second request for recording the first reaction to the email message responsive to the computing device interacting with an interactive content item of the one or more interactive content items in the second page, wherein, the first interactive element includes:

an interactive area of an image map overlaid over the one or more images such that the interactive area overlaps the second graphical element; or an interactive image displayed in the email message and depicting the second graphical element.

9. The system of claim 1, wherein the computer-executable instructions when executed by the one or more processors further cause the one or more processors to:

receive a third request for one or more second images from a second computing device responsive to the second computing device accessing the email message;

generate the one or more second images using the updated information indicative of the reactions recorded in association with the email message; and send the one or more second images to the second computing device for display in the email message accessed by the second computing device.

10. The system of claim 1, wherein the computer-executable instructions when executed by the one or more processors further cause the one or more processors to:

receive a third request for one or more second images from the computing device, responsive to the computing device refreshing the email message;

generate the one or more second images using the updated information indicative of recorded reactions in association with the email message; and send the one or more second images to the computing device for display in the refreshed email message.

11. The system of claim 1, wherein the one or more first graphical elements depicted by the one or more images represent one or more reactions recorded in association with the email message.

12. The system of claim 1, wherein the software instructions embedded in the email message include HTML executable instructions including one or more references to the one or more images.

13. A method, comprising:
receiving, by a computer system from a computing device, based on the computing device opening an email message, a first request for one or more images to be displayed in the email message, wherein software instructions embedded in the email message cause the computing device to send the first request based on the computing device opening the email message;
generating, by the computer system, responsive to the first request, the one or more images using information indicative of reactions recorded in association with the email message;
sending, by the computer system, the one or more images to the computing device for display in the email message, the one or more images when displayed in the email message depict one or more first graphical elements representing one or more reactions to the email message;
receiving, by the computer system from the computing device, a second request for recording a first reaction to the email message based on the computing device interacting with a first interactive element rendered in the email message, the second request being a request for a first page and including an indicator of the first reaction, and wherein the second request comprises at least one of: (i) a uniform resource locator including the indicator of the first reaction or (ii) a session cookie of the computing device;
updating, by the computer system, responsive to the second request, the information indicative of the reactions recorded in association with the email message to account for the first reaction; and
sending, by the computer system, the first page to the computing device for display, the first page confirming the recording of the first reaction to the email message.

14. The method of claim 13, wherein the first interactive element includes an image map overlaid over the one or more images when displayed within the email message.

15. The method of claim 14, wherein the indicator of the first reaction includes an identifier of the image map and an identifier of a first interactive area, of a plurality of interactive areas of the image map, with which the computing device interacted,
wherein each graphical element of the one or more first graphical elements represents a corresponding reaction and is associated with a corresponding interactive area of the plurality of interactive areas of the image map, and
wherein the method further comprising identifying the first reaction using the identifier of the image map and the identifier of the first interactive area of the image map.

16. The method of claim 13, wherein the one or more images include one or more interactive images, each interactive image depicting a corresponding graphical element of the one or more first graphical elements and representing a corresponding reaction of the one or more reactions, and wherein the first interactive element includes a first interactive image of the one or more interactive images.

17. The method of claim 16, wherein each interactive image is associated with a respective link including an identifier of the interactive image, and wherein the method comprises:

receiving a first link associated with the first interactive image based on the computing device interacting with the first interactive image, the first link representing the second request and including an identifier of the first interactive image; and
identifying the first reaction based on the identifier of the first interactive image.

18. The method of claim 13, wherein the first interactive element includes a link indicative of a second page including a plurality of interactive content items representing a plurality of reactions, and wherein receiving the second request for recording the first reaction includes:
receiving, by the computer system, from the computing device, a third request for the second page based on the computing device interacting with the link rendered in the email message;
providing, by the computer system, based on the third request, the second page to the computing device for display; and
receiving, by the computer system, from the computing device, the second request for recording the first reaction to the email message based on the computing device interacting with an interactive content item of the plurality of interactive content items in the second page.

19. The method of claim 13, wherein the one or more images when displayed in the email message further depict a second graphical element indicative of a second page including one or more interactive content items representing one or more additional reactions.

20. The method of claim 19, wherein receiving the second request for recording the first reaction includes:
receiving, by the computer system from the computing device, a third request for the second page based on the computing device interacting with the first interactive element rendered in the email message;
providing, by the computer system, based on the third request, the second page to the computing device for display; and
receiving, by the computer system from the computing device, the second request for recording the first reaction to the email message based on the computing device interacting with an interactive content item of the one or more interactive content items in the second page,
wherein, the first interactive element includes:
an interactive area of an image map overlaid over the one or more images such that the interactive area overlaps the second graphical element; or
an interactive image displayed in the email message and depicting the second graphical element.

21. The method of claim 13, further comprising:
receiving, by the computer system, a third request for one or more second images from a second computing device based on the second computing device accessing the email message;
generating, by the computer system, one or more second images using the updated information indicative of reactions recorded in association with the email message; and
sending, by the computer system, the one or more second images to the second computing device for display in the email message accessed by the second computing device.

22. The method of claim 13, further comprising:
receiving, by the computer system, a third request for one or more second images from the computing device based on the computing device refreshing the email message;
generating, by the computer system, the one or more second images using the updated information indicative of the reactions recorded in association with the email message; and
sending, by the computer system, the one or more second images to the computing device for display in the refreshed email message.

23. The method of claim 13, wherein the one or more first graphical elements depicted by the one or more images represent one or more reactions recorded in association with the email message.

24. The method of claim 13, wherein the software instructions embedded in the email message include HTML executable instructions including one or more references to the one or more images.

25. A non-transitory computer-readable medium storing computer-executable instructions, the computer-executable instructions when executed by at least one processor cause the at least one processor to:
receive, from a computing device, a first request for one or more images to be displayed in an email message responsive to the computing device opening the email message, wherein software instructions embedded in the email message causing the computing device to send the first request responsive to the computing device opening the email message;
generate, responsive to the first request, the one or more images using information indicative of reactions recorded in association with the email message;
send the one or more images to the computing device for display in the email message, the one or more images when displayed in the email message depict one or more first graphical elements representing one or more reactions to the email message;
receive, from the computing device, a second request for recording a first reaction to the email message responsive to the computing device interacting with a first interactive element rendered in the email message, the second request being a request for a first page and including an indicator of the first reaction, and wherein the second request comprises at least one of: (i) a uniform resource locator including the indicator of the first reaction or (ii) a session cookie of the computing device;
update, responsive to the second request, the information indicative of the reactions recorded in association with the email message to account for the first reaction; and
send the first page to the computing device for display, the first page confirming the recording of the first reaction to the email message.

\* \* \* \* \*